United States Patent [19]
Mitsui et al.

[11] Patent Number: 6,072,553
[45] Date of Patent: Jun. 6, 2000

[54] REFLECTION-TYPE LIQUID CRYSTAL DISPLAY WITH LAYER COMPRISING LIQUID CRYSTAL COMPOUND AND LIQUID CRYSTAL POLYMER BEING TWIST-ALIGNED AT SAME ANGLE

[75] Inventors: Seiichi Mitsui; Masayuki Okamoto, both of Kashiwa; Shun Ueki, Matsudo, all of Japan

[73] Assignee: Sharp Kabushiki Kaisha, Osaka, Japan

[21] Appl. No.: 09/030,154

[22] Filed: Feb. 25, 1998

[30] Foreign Application Priority Data

Feb. 26, 1997 [JP] Japan ................................. 9-041795

[51] Int. Cl.[7] ...................... G02F 1/1335; G02F 1/1333; C09K 19/02
[52] U.S. Cl. .............................. 349/113; 349/86; 349/93; 349/183
[58] Field of Search ..................... 349/113, 183, 349/86, 93, 99, 106

[56] References Cited

U.S. PATENT DOCUMENTS

| | | | |
|---|---|---|---|
| 5,460,748 | 10/1995 | Mazaki et al. | 252/299.01 |
| 5,500,750 | 3/1996 | Kanbe et al. | 359/58 |
| 5,568,294 | 10/1996 | Lee | 359/73 |
| 5,570,210 | 10/1996 | Yoshida et al. | 359/51 |
| 5,583,673 | 12/1996 | Onishi et al. | 349/89 |
| 5,702,642 | 12/1997 | Yamada et al. | 349/183 |
| 5,729,313 | 3/1998 | Mitsui | 349/106 |
| 5,847,789 | 12/1998 | Nakamura et al. | 349/99 |
| 5,889,570 | 3/1999 | Mitsui et al. | 349/113 |
| 5,917,567 | 6/1999 | Oh et al. | 349/113 |

FOREIGN PATENT DOCUMENTS

| | | |
|---|---|---|
| 3-223715 | 10/1991 | Japan . |
| 404204820 | 7/1992 | Japan . |
| 7-28054 | 1/1995 | Japan . |
| 7-218905 | 8/1995 | Japan . |
| 7-218906 | 8/1995 | Japan . |
| 40809256 | 4/1996 | Japan . |
| 408190086 | 7/1996 | Japan . |
| 40906179 | 3/1997 | Japan . |

OTHER PUBLICATIONS

T. Sonehara et al., "A New Twisted Nematic ECB (TN–ECB) Mode for a Reflective Light Valve", *Japan Display*, 1989, pp. 192–195.

*Primary Examiner*—William L. Sikes
*Assistant Examiner*—Tarifur R. Chowdhury
*Attorney, Agent, or Firm*—David G. Conlin; George W. Neuner; Dike, Bronstein, Roberts and Cushman LLP

[57] ABSTRACT

A liquid crystal element is equipped with at least one polarizer provided on a light entering side thereof, an insulating substrate on which transparent electrodes, a light reflecting member having a light reflecting surface on one side thereof, and a liquid crystal layer sealed between the insulating substrate and the reflecting member, in which liquid crystal molecules and liquid-crystalline polymers are both twist-aligned through a same angle. In the case of a dark display, incident light linearly polarized enters the liquid crystal layer, becoming circularly polarized light at the reflection surface, and after being reflected, when outgoing, the light becomes a linearly polarized light having a plane of polarization rotated through an angle of 90° as compared with that of the incident light. On the other hand, in the case of a bright display, the incident light linearly polarized enters, and when outgoing, it has become diffused light, resulting from that only polarized light components identical to the incident light passed through the element. Thus, by applying a new LCD mode in which the absorption state and the diffusion state are controlled by application of a voltage, a reflection-type LCD device with high colorfulness and display performance, which does not cause a parallax, can be provided.

21 Claims, 16 Drawing Sheets

BRIGHT STATE
(WHEN VOLTAGE IS APPLIED)

DARK STATE
(WHEN NO VOLTAGE IS APPLIED)

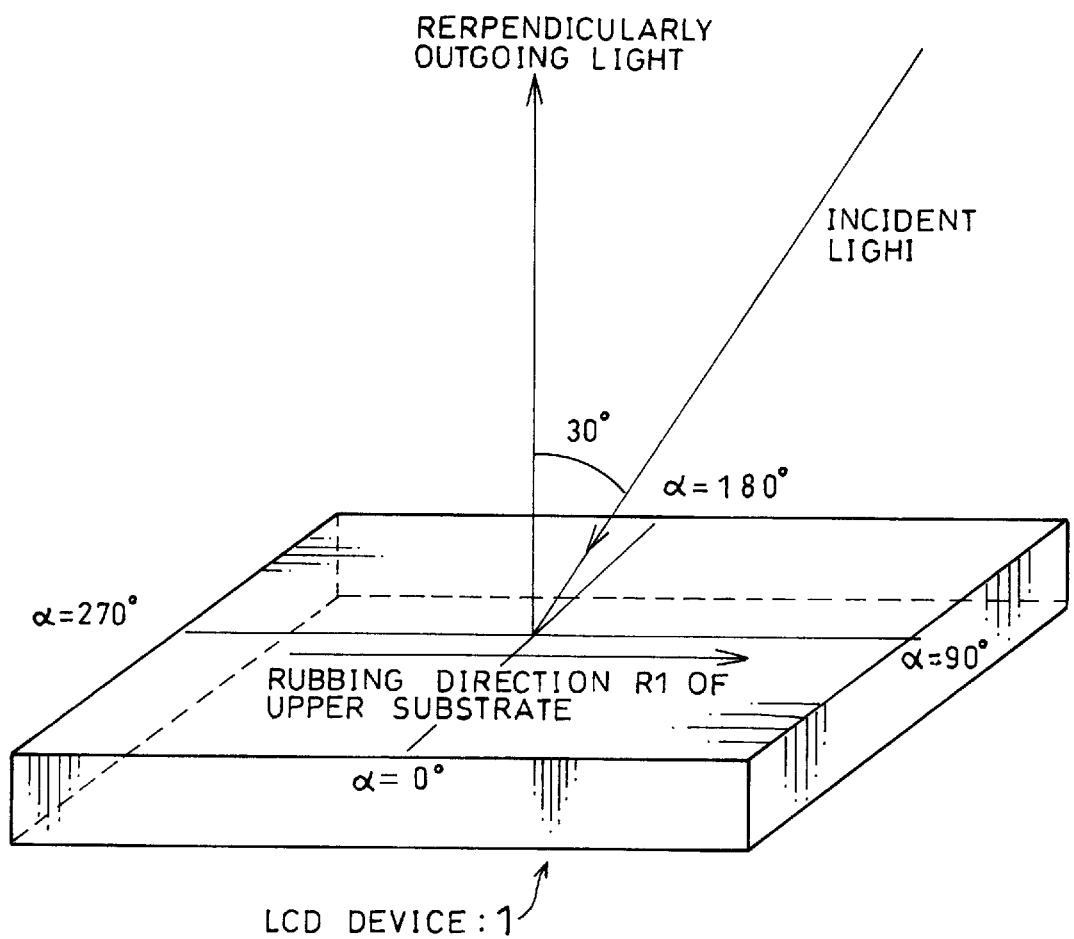

WHEN NO VOLTAGE IS APPLIED

WHEN VOLTAGE IS APPLIED

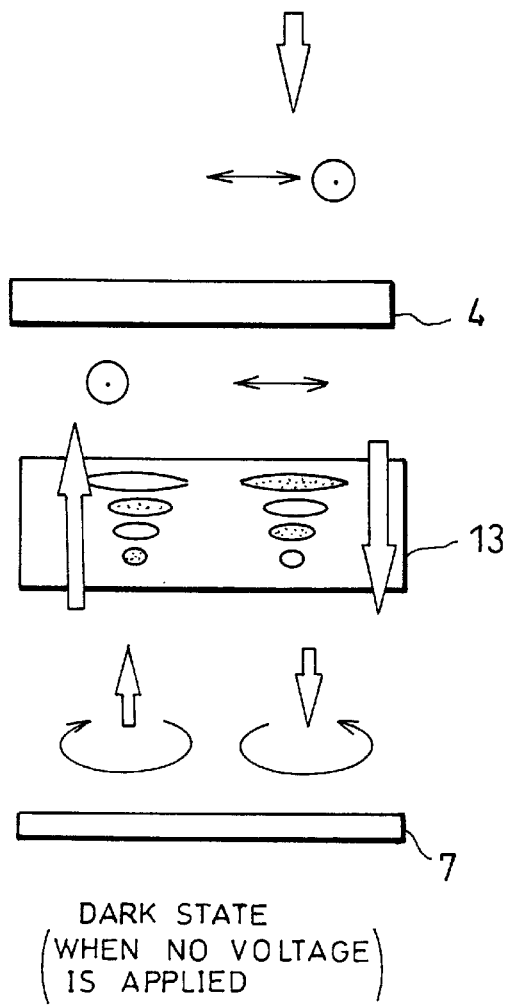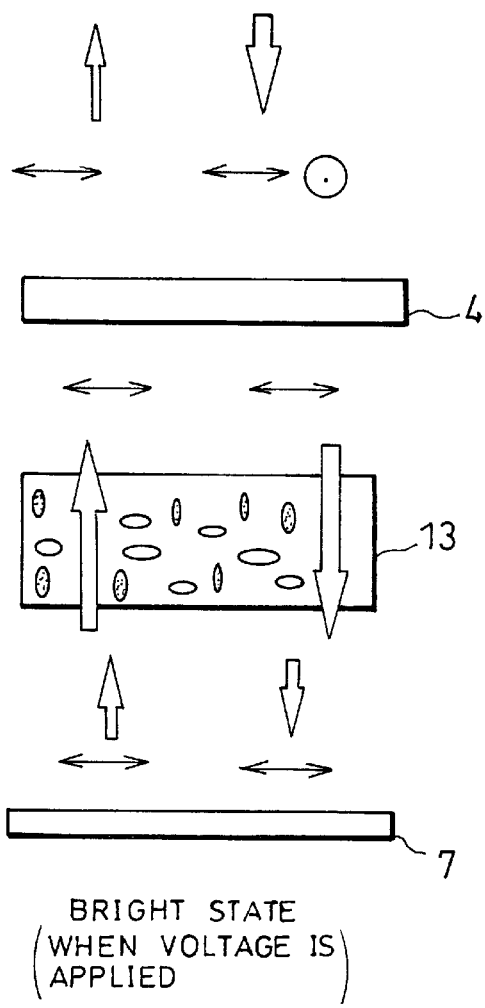
FIG. 8(a) DARK STATE (WHEN NO VOLTAGE IS APPLIED)
FIG. 8(b) BRIGHT STATE (WHEN VOLTAGE IS APPLIED)

BRIGHT STATE
(WHEN VOLTAGE IS APPLIED)

DARK STATE
(WHEN NO VOLTAGE IS APPLIED)

FIG.17(a) PRIOR ART
FIG.17(b) PRIOR ART
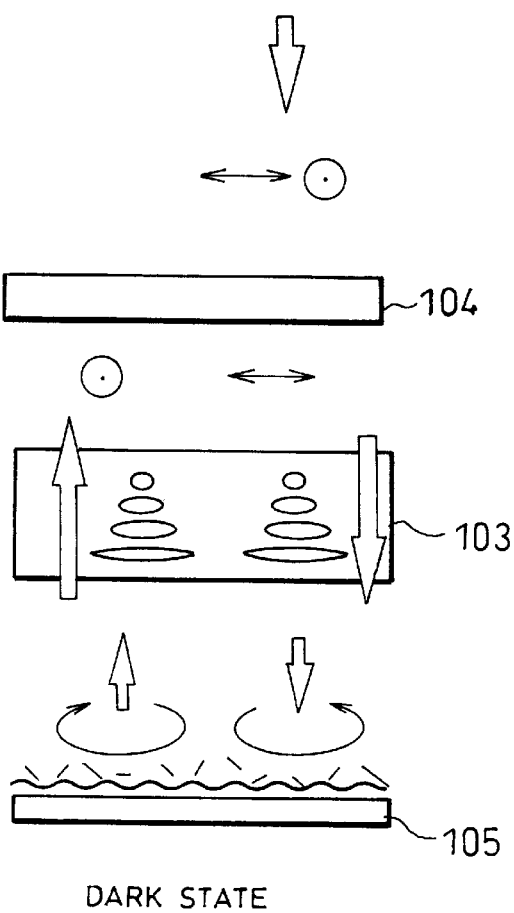
DARK STATE
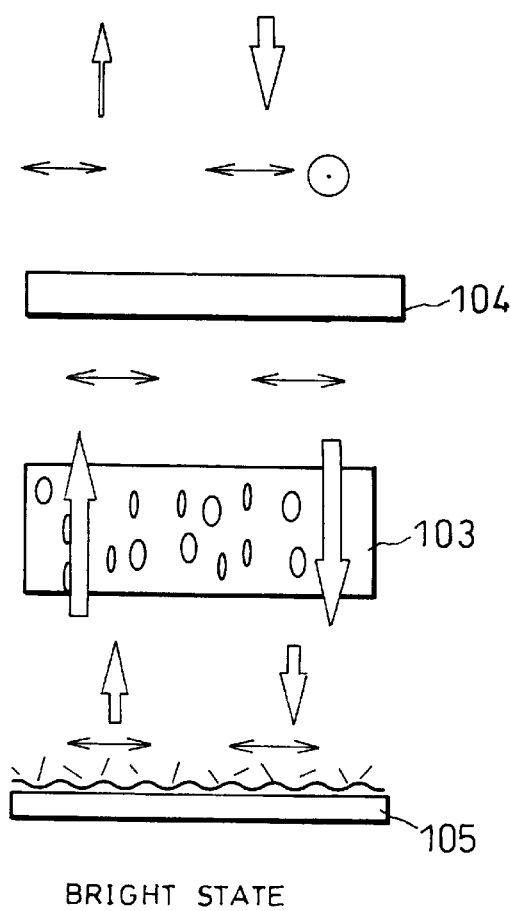
BRIGHT STATE

REFLECTION-TYPE LIQUID CRYSTAL DISPLAY WITH LAYER COMPRISING LIQUID CRYSTAL COMPOUND AND LIQUID CRYSTAL POLYMER BEING TWIST-ALIGNED AT SAME ANGLE

FIELD OF THE INVENTION

The present invention relates to a direct-view liquid crystal display device of a reflection type which does not use a backlight, and more specifically relates to a liquid crystal display device of the reflection type which is particularly suitable for office automation equipments such as a word processor and a so-called notebook-type personal computer, audio-visual equipments of various types, and game machines.

BACKGROUND OF THE INVENTION

Among liquid crystal display (LCD) devices, reflection-type LCD devices which conduct display by reflecting light which has entered from outside have drawn particular attention since they do not necessitate backlights as light sources, thereby consuming less power and being able to be formed smaller and lighter.

Therefore, in the case where a conventional TN-type or STN-type LCD element is applied to a reflection-type LCD device, the LCD element has to be provided between a pair of polarizers, with a reflection plate provided on its outer side. Therefore, due to the thickness of glass substrates used therein, a parallax occurs in accordance with an angle with which the user views the glass substrates, that is, an angle between a normal direction of the glass substrate and a direction in which the user views the LCD element. As a result, a drawback in that the display is seen dual occurs.

Besides, conventionally, multi-color display or full-color display is realized by, for example, providing a micro color filter of three dots (red, green, and blue) for each pixel in a liquid crystal cell, and conducting additive mixing. However, since the aforementioned liquid crystal display mode necessitates two polarizers, the display is very dark, and on top of that, the additive mixing cannot be adequately carried out due to the occurrence of the parallax, the above multi-color or full-color scheme has not been adopted to the reflection-type color display device.

Then, recently, an LCD element in which one polarizer and one reflection plate are used has been developed. For example, a direct-view LCD device of the reflection type in which a twist-aligned liquid crystal layer is provided between (1) a minutely uneven reflection plate (provided on an inner side of a cell) and (2) a polarizer is disclosed in the Japanese Publication for Laid-Open Patent Application No.3-223715/1991 (Tokukaihei 3-223715).

FIG. 16 is a cross-sectional view illustrating an arrangement of a reflection-type LCD device 100 disclosed in the above publication. The reflection-type LCD device 100 is composed of transparent substrates 101 and 102, a twist-aligned liquid crystal layer 103, transparent electrodes 108, uneven reflective electrodes 105, and alignment films 106 and 107. For example, the twist-aligned liquid crystal layer 103 having a positive dielectric anisotropy is provided between the transparent substrates 101 and 102 made of glass. The alignment films 106 and 107 are formed on the transparent electrodes 108 provided on the transparent substrate 101, and on the uneven reflective electrodes 105 provided on the transparent substrate 102, respectively. Alignment processing, such as a rubbing operation, has been applied to surfaces of the alignment films so that liquid crystal molecules of the liquid crystal layer 103 are aligned in parallel with the substrates. Herein, a twist angle of the liquid crystal is set to, for example, 63° in a state where no voltage is applied.

The display mechanism is explained as follows, with reference to FIGS. 17(a) and 17(b). In a bright state, as illustrated in FIG. 17(b), linearly polarized light which has passed through the polarizer 104 from the transparent substrate 101 side enters the twist-aligned liquid crystal layer 103. The linearly polarized light passes the twist-aligned liquid crystal layer 103 and is converted to linearly polarized light, and is diffusely reflected by the reflection plates 105, then becoming linearly polarized light. Subsequently, by passing through the twist-aligned liquid crystal layer 103, it becomes linearly polarized light having a plane of polarization in the same direction as that when first entering the liquid crystal layer 103, and goes through the polarizer 104 without changing. Thus, the bright display is realized.

On the other hand, as illustrated by FIG. 17(a), when a voltage is applied, the liquid crystal layer 103 loses the twist alignment, and becomes aligned in a direction in accordance with a direction of the electric field. The linearly polarized light having passed through the polarizer 104 from the transparent substrate 101 side enters the liquid crystal layer 103. The linearly polarized light thus having entered passes through the liquid crystal layer 103, becoming right-handed circularly polarized light. The, it becomes left-handed circularly polarized light due to the reflection plates 105, being diffusely reflected, and again enters the liquid crystal layer 103. Here, the left-handed circularly polarized light becomes linearly polarized light tilted through an angle of 90° as compared with the light when first entering the liquid crystal layer 103, and is absorbed by the polarizer 104. Thus, the dark display is realized. With this arrangement, no parallax occurs and a refractive index is higher, as compared with the arrangement wherein two polarizers are used.

Furthermore, a reflection-type LCD device wherein one polarizer, a quarter wave length plate, polymer dispersion liquid crystal, and mirror reflection plates are provided in this order from a light incidence side is disclosed in the Japanese Publication for Laid-Open Patent Application No. 7-28054/1995 (Tokukaihei 7-28054).

The reflection-type LCD device is characterized in that the polymer dispersion liquid crystal layer is sealed between transparent electrodes provided on one side surface of a first transparent substrate and reflection electrodes provided on a surface of a second transparent substrate, and the quarter wave length plate and a polarizer are laminated on the other side surface of the first transparent substrate. The liquid crystal of the polymer dispersion liquid crystal layer is aligned at random when no voltage is applied, and the polarization of light is cancelled when the light passes therethrough, thereby causing the display to shift to a bright state. On the other hand, the liquid crystal is aligned perpendicularly with respect to the transparent electrodes and the reflection electrodes when a voltage is applied. Therefore, a birefringence effect does not occur with respect to the perpendicular incident light. For this reason, light which enters from outside and then becomes about to again go to outside passes the quarter wave length plate twice, and hence comes to have a phase shift substantially corresponding to half wave, thereby having its plane of polarization rotated through an angle of 90°. As a result, the light is absorbed by the polarizer when the light is outgoing, thereby causing the display to shift to a dark state.

However, according to the reflection-type LCD device disclosed in Tokukaihei 3-223715, to realize a white display, a diffusing reflection plate is indispensable behind the liquid crystal layer, since the display of the device is conducted by controlling the transmission state and the absorption state of the liquid crystal element with the use of a voltage. In other words, the performance of the diffusing reflection plate determines display performance. For example, the reflection plate used for the display scheme described above does not cause the incident light to maintain polarization, the conversion of the right-handed circularly polarized light to the left-handed circularly polarized light, or the reverse conversion is not efficiently carried out, and light is leaked during the dark display, thereby impairing contrast.

Furthermore, as the reflection member having a property of maintaining polarization, a flat mirror reflection member can be used, but since objects outside are reflected on its surface as they are, neighboring information is also reflected and is mixed in the display when it is in the bright state (this phenomenon is hereinafter referred to as "mixing reflection"), thereby impairing the visibility. Therefore, the reflection plate preferably has a light diffusing property.

Therefore, as a method for forming a reflection plate which is capable of controlling the polarizing property while maintaining the light diffusing property, a method whereby an aluminum film is formed on an uneven part made of a smooth photosensitive resin is disclosed in the Japanese Publication for Laid-Open Patent Application No. 7-218906/1995 (Tokukaihei 7-218906). It is reported in the publication that a degree of maintaining the polarizing property (hereinafter referred to as polarizing property maintenance degree) has to be not less than 50 percent so as to achieve a contrast degree of 4, while the polarizing property maintenance degree has to be not less than 70 percent so as to achieve a contrast degree of 7. As the polarizing property maintenance degree is enhanced, the contrast degree becomes higher, but an angle of visibility becomes narrower, thereby causing a drawback in that the display becomes hard to see. On the other hand, as the polarization maintenance degree is lowered so as to enhance the diffusing property and widen the angle of visibility, the contrast is drastically impaired. In short, it is impossible to provide a reflection plate which perfectly maintains the polarizing property and the light diffusing property both, and a monochromatic display which is easy to see cannot be realized.

Besides, as to the reflection-type display device disclosed in Tokukaihei 7-28054, the dark state without diffusing is realized. However, in the bright state, it has a problem as follows. Half of incident light is absorbed by the polarizer, and then, the light is further decreased to ½ by the polarizer when the light goes out, since the light is directed at random and the polarization thereof is cancelled. As a result, the brightness becomes ¼ or less, making the display dark.

SUMMARY OF THE INVENTION

The object of the present invention is to provide a reflection-type LCD device which features a completely new liquid crystal display mode in which a light absorption state and a light diffusing state are controllable with application of a voltage, thereby causing no parallax and achieving high colorfulness and display performance.

To achieve the above object, a reflection-type LCD device of the present invention is characterized in comprising (1) an insulating substrate having transparent electrodes thereon, (2) a light reflecting member having a light reflecting surface on one side thereof, (3) a liquid crystal layer sealed between the insulating substrate and the light reflecting member, and (4) at least one polarizer provided on a light entering side to the liquid crystal layer, wherein (i) the liquid crystal layer includes liquid crystal molecules and liquid-crystalline polymers, (ii) for a dark display, incident light which is linearly polarized by the polarizer to have a first plane of polarization is converted to circularly polarized light and reaches the reflection surface, and then, the light reflected by the reflection surface is converted to linearly polarized light having a second plane of polarization when outgoing to the polarizer, the second plane of polarization being same as the first plane of polarization rotated through an angle of 90°, and (iii) for a bright display, the light is diffused when outgoing, with the first plane of polarization substantially maintained.

With the above arrangement wherein a complex of liquid crystal and liquid-crystalline polymers is used for the liquid crystal layer provided between one polarizer and the light reflecting member, a driving voltage can be set relatively lower, and a resultant liquid crystal display (LCD) device features no occurrence of "mixing reflection" due to a nebular state of the polymer-dispersed liquid crystal in the bright state even though electrodes on one side are reflection electrodes. Moreover, the LCD device causes no parallax, and has a wide angle of visibility and sufficient brightness without inappropriate coloring.

Furthermore, since the liquid-crystalline polymers and the liquid crystal molecules are twist-aligned through the same angle, the liquid crystal layer is capable of conversion from linearly polarized light to circularly polarized light and vice versa in the case of the dark display, like in the case where the liquid crystal layer is composed of only liquid crystal molecules. As a result, a clear black display can be realized, and contrast of the reflection-type LCD device can be enhanced.

Thus, the reflection-type LCD device is arranged so as to feature lower power consumption and superior visibility, as compared with an LCD device with a backlight.

The phenomenon of diffusion by the liquid crystal layer is peculiar to the combination of the liquid, crystal and the liquid-crystalline polymer, and it does not occur to a combination of liquid crystal and non-liquid-crystalline polymer. Therefore, by selecting not a usual polymerizable material but a material such as UV curable liquid crystal which becomes liquid-crystalline polymer when mixed with liquid crystal and polymerized, the liquid crystal layer can be formed.

In the above arrangement, the liquid crystal molecules and the liquid-crystalline polymers preferably have substantially same refractive indexes with respect to extraordinary rays, and substantially same refractive indexes with respect to ordinary rays. With this, the liquid crystal layer is surely made to have a function for not diffusing light in the dark display while diffusing light in the bright display.

Furthermore, the light reflecting surface of the light reflecting member is preferably a smooth and uneven surface, or a flat mirror surface. In the case where it is a flat mirror surface, brightness and contrast of the display are enhanced since the incident light is reflected with the polarization substantially completely maintained. Note that in the bright display, no "mixing reflection" occurs even though the surface is flat, since the liquid crystal layer diffuses light.

On the other hand, in the case where the surface is uneven, the liquid crystal layer and the light reflecting member both diffuse light. Therefore, protuberances can be made not as high as those of a conventional uneven reflection plate, and hence contrast of the reflection-type LCD device can be improved. Furthermore, as compared with the case where the light reflecting member is flat and diffusion is caused only by the liquid crystal layer, retardation of the liquid crystal layer can be lessened. Therefore, the angle of visibility of the reflection-type LCD device can be made greater.

Incidentally, as for the arrangement of the polarizer and the liquid crystal molecules, a transmission axis of the polarizer and an alignment direction of the liquid crystal molecules on a light entering side are set so as to be substantially parallel. More preferably, the transmission axis of the polarizer is tilted with respect to the alignment direction of the liquid crystal molecules on the light entering side, by an angle of 165° to 195° in an anti-clockwise direction. With this, in the dark display, diffusion or reflection of the incident light can be suppressed, and as a result a clear black display can be realized.

Furthermore, the transmission axis of the polarizer is preferably set in a substantially same direction as an alignment direction of the liquid crystal molecules positioning in the middle in a thickness direction of the liquid crystal layer. More specifically, the transmission axis of the polarizer is tilted with respect to the alignment direction of the liquid crystal molecules positioning in the middle in the thickness direction of the liquid crystal layer, at an angle of −15° to +15° in an anti-clockwise direction. As a result, the reflectance in the bright display becomes greater than that in conventional cases (½), even though the polarizer is provided. Thus, a remarkably bright display can be realized.

For a fuller understanding of the nature and advantages of the invention, reference should be made to the ensuing detailed description taken in conjunction with the accompanying drawings.

BRIEF DESCRIPTION OF THE DRAWINGS

FIG. 6 is an explanatory view illustrating a method for measuring optical properties of the LCD device.

FIG. 7(a) shows a state when no voltage is applied, while FIG. 7(b) shows a state when a voltage is applied.

FIGS. 8(a) and 8(b) are explanatory views illustrating displaying mechanisms of the LCD device. FIG. 8(a) shows a state when no voltage is applied, that is, a dark state, while FIG. 8(b) shows a state when a voltage is applied, that is, a bright state.

FIG. 14(a) is a graph in the case where a twist angle of a liquid crystal layer is 80°, while FIG. 14(b) is a graph in the case where the twist angle is 95°.

FIGS. 17(a) and 17(b) are explanatory views illustrating display mechanisms of the conventional LCD device. FIG. 17(a) shows a dark state, while FIG. 17(b) shows a bright state.

DESCRIPTION OF THE PREFERRED EMBODIMENTS

Figure 1:
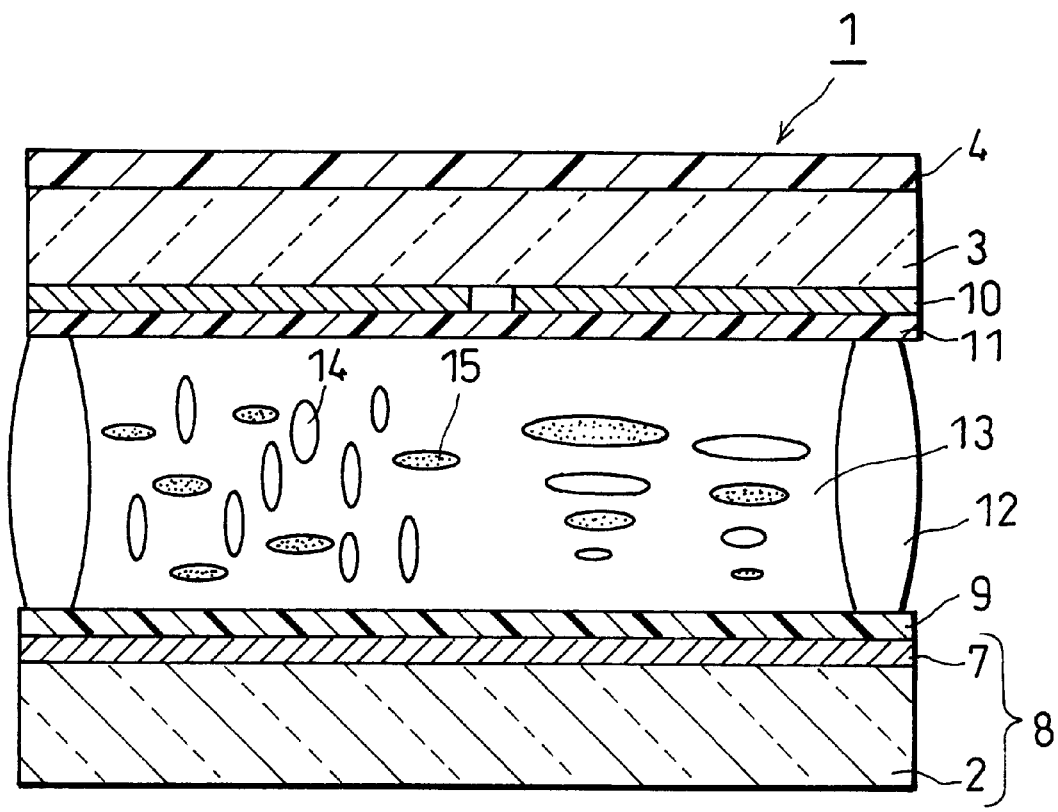
FIG. 1 is a cross-sectional view illustrating an LCD device in accordance with an embodiment of the present invention.

The following description will explain embodiments of the present invention, while referring to the drawings.

[First Embodiment]

FIG. 1 is a cross-sectional view of a reflection-type LCD device in accordance with the first embodiment of the present invention. An LCD device 1 is equipped with a pair of transparent glass substrates 2 and 3. On the glass substrate 2, reflection metal films 7 made of aluminum, nickel, chrome, silver, or the like are formed, and the glass substrate 2 and the reflection metal films 7 constitute a reflection plate 8 as a light reflecting member. On the reflection films 7, an alignment film 9 used for aligning a liquid crystal layer is formed.

On a surface of the glass substrate 3 on a side to the glass substrate 2, transparent electrodes 10 made of ITO (indium tim oxide) or the like are formed. An electric field is applied to a liquid crystal layer 13 by the reflection metal films 7 and the transparent electrodes 10. An alignment film 11 is formed so as to cover the glass substrate 3 on which the transparent electrodes 10 are formed, and the glass substrates 2 and 3 facing vis-a-vis each other are sealed with a sealing member 12 (described later) applied to peripheral parts of the glass substrates 2 and 3. A rubbing operation is applied to the alignment films 9 and 11 so that the liquid crystal layer 13 is twisted aligned through an angle of 63°. The liquid crystal layer 13 is composed of nematic liquid crystal 14 and liquid-crystalline polymers 15. On a surface of the glass substrate 3 on a side opposite to the liquid crystal layer 13, a polarizer 4 with a transmittance of single piece of 48 percent is provided.

Figure 2:
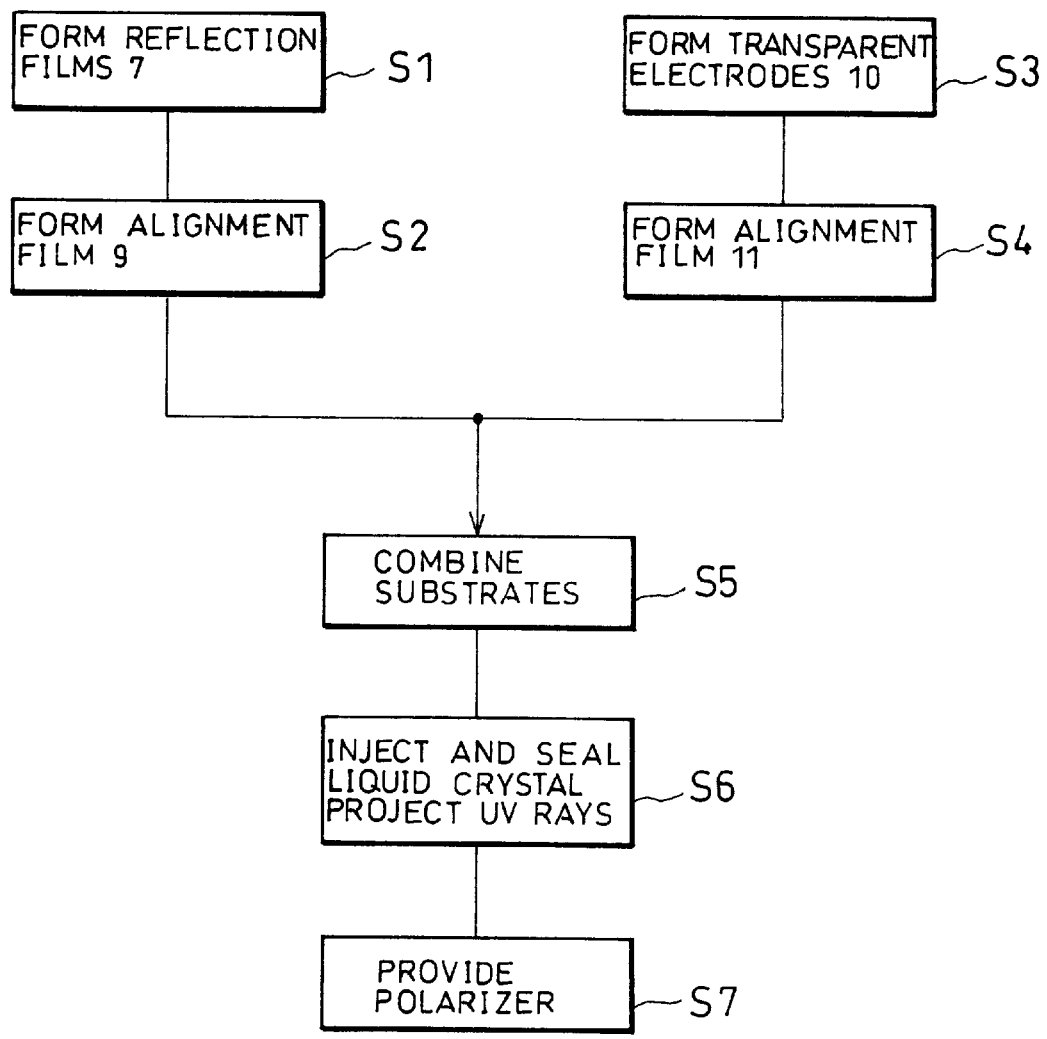
FIG. 2 is a process drawing illustrating a manufacturing process of the LCD device.

FIG. 2 is a process drawing illustrating a manufacturing process of the reflection-type LCD device 1.

At a step S1, the reflection metal films 7 are formed on the substrate 2. The reflection metal films 7 are formed by forming films made of a metal having a high reflectance and a low resistance, such as Al or Ag, by the sputtering method or the vapor-deposition method. Here, the reflection metal films 7 are preferably formed so as to have mirror surfaces so that they do not have a property of cancelling the polarization, and this is enabled by controlling a film formation temperature, a film formation speed, and the like. A film thickness thereof has to be set in a range such that the reflection metal films 7 have a sufficient reflectance and a low resistance, and a range of 0.5 µm to 2 µm is preferable. In the case of the present embodiment, the reflection metal films 7 have a function as electrodes for applying electric fields to the liquid crystal and a function as a reflection film for reflecting incident light both.

At a step S2, the alignment film 9 made of polyimide resin is formed on the reflection films 7, and a rubbing operation is applied to it. More specifically, on the substrate 2, a polyimide resin film is formed by the printing method, and it is baked at a temperature of 200° C. for one hour. For example, SE150 (produced by Nissan Chemical Industries, Ltd.) which aligns the liquid crystal in parallel with the substrates is used for making the alignment film 9. Thereafter, a rubbing operation for aligning the liquid crystal layer is applied thereto.

At a step S3, the transparent electrodes 10 are formed on the surface of the substrate 3. In the present embodiment, the transparent electrodes 10 made of ITO (indium tin oxide) or the like are formed by the sputtering method.

At a step S4, the alignment film 11 is formed over the transparent electrodes 10. The alignment film 11 is formed in the same manner as at the step S2. A rubbing direction of the rubbing operation with respect to the alignment film 11 is determined so that a twist alignment at an angle of, for example, 63° between the substrates 2 and 3 is achieved.

At a step S5, the substrates 2 and 3 are stuck to each other. On combining the substrates 2 and 3, spacers with a diameter of 1.5 µm are scatteringly provided between the substrates 2 and 3, so as to adjust the thickness of the liquid crystal layer 13. The substrates 2 and 3 thus provided vis-a-vis each other are stuck with the sealing member 12, thereby constituting a cell.

At a step S6, by vacuuming the cell thus formed, a mixture of a nematic liquid crystal 14 and a material of the liquid-crystalline polymers 15 is sealed in the cell. After the sealing, ultraviolet is projected thereon, and the liquid crystal layer 13 is formed. To form the liquid crystal layer 13 of the present embodiment, a product of Merck Ltd. (trade name: ZLI1565), for example, is used as the nematic liquid crystal 14 having a positive dielectric anisotropy Δε. As the material of the liquid-crystalline polymers 15 to be mixed therein, ultraviolet (UV) curable liquid crystal before polymerization is used. The UV curable liquid crystal has a liquid crystal phase at ordinary temperature, can be aligned as usual liquid crystal materials, and becomes polymerized and cured in response to irradiation by the ultraviolet while maintaining the arrangement of the liquid crystal molecules, thereby becoming liquid-crystalline polymers. The UV curable liquid crystal before exposure to the ultraviolet is hereinafter referred to as UV curable liquid crystal, and that after the exposure to the ultraviolet is hereinafter referred to as liquid-crystalline polymers. To be more specific, for example, the nematic liquid crystal 14 and the UV curable liquid crystal are mixed at a ratio by weight of 85:15, and is injected by vacuuming into the 1.5 µm thick cell produced at the step S5. Then, ultraviolet having an intensity of 10 mW/cm² is projected thereto for 300 seconds so that only the UV curable liquid crystal is cured. Thus, the liquid crystal layer 13 twist-aligned through an angle of 63° is formed. The twist angle of the nematic liquid crystal 14 is 63°, and a product (unit: µm, hereinafter referred to as Δnd) of birefringence of the liquid crystal and a thickness of the liquid crystal is 0.205. As the nematic liquid crystal 14 and the UV curable liquid crystal, those which have substantially same light refractive indexes with respect to ordinary rays and substantially same light refractive indexes with respect to extraordinary rays are selected. However, it has been confirmed that depending on manufacturing conditions, substantially same effects are exhibited even with the use of different refractive indexes.

At a step S7, the polarizer 4 is provided on a light entering surface of the substrate 3. Thus, the reflection-type LCD device 1 is manufactured.

Figure 3:
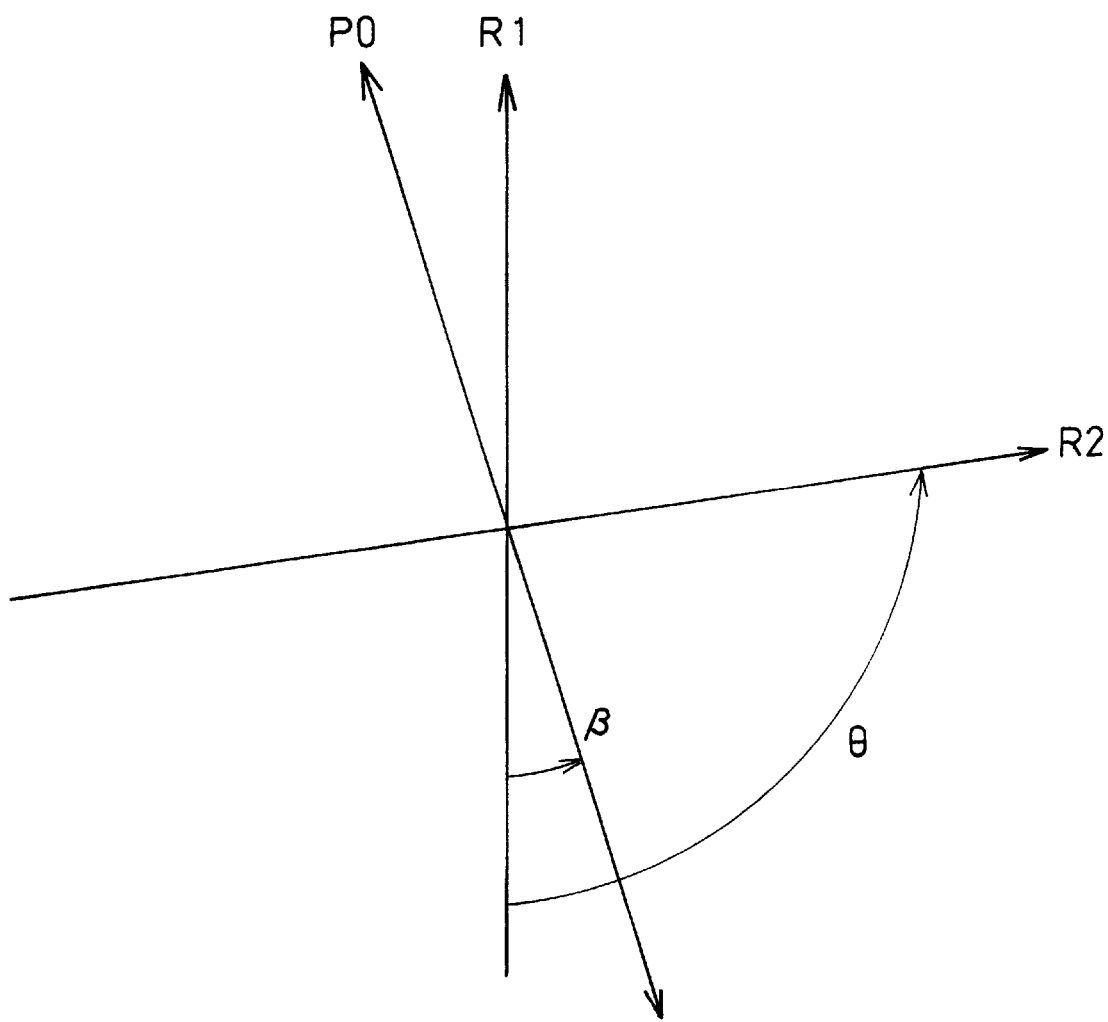
FIG. 3 is an explanatory view illustrating an optical arrangement of the LCD device.

In the LCD device 1 manufactured through the steps S1 through S7, an optical arrangement of the polarizer 4 and the liquid crystal layer 13 is determined as shown in FIG. 3. Note that FIG. 3 is a schematic view obtained by observing the reflection-type LCD device 1 in FIG. 1 from above (from the light entering side). More specifically, let an alignment direction of the liquid crystal molecules in the liquid crystal 13 on a side to the upper substrate 3 be R1, and let an angle in the anti-clockwise direction of an axial direction P0 of a polarization axis (transmission axis) with respect to the alignment direction R1 be β. Besides, let a twist angle in the anti-clockwise direction of the alignment direction R1 (a direction shown by an arrow is a rubbing direction) with respect to an alignment direction R2 (a direction shown by an arrow is a rubbing direction) of the liquid crystal molecules on an opposite side (the side to the reflection metal films 7) be θ. In the present embodiment, β and θ are set to 0° and 63°, respectively.

Figure 4:
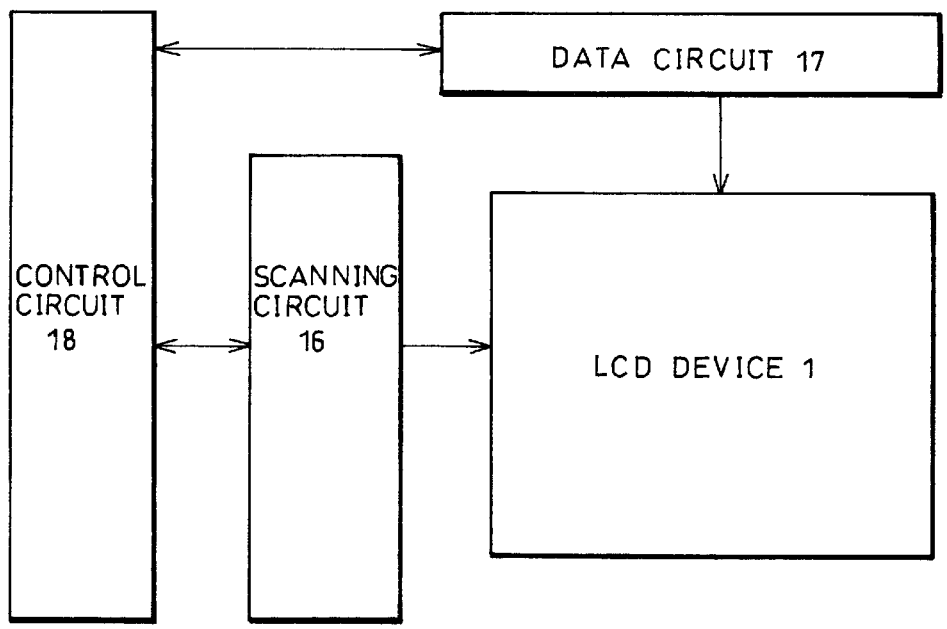
FIG. 4 is an explanatory view illustrating a driving system of the LCD device.

Then, the following description will explain operational circuits, while referring to FIG. 4. A scanning circuit 16 is connected to either of the reflection metal films 7 and the transparent electrodes 10, and a data circuit 17 is connected to the other. The scanning circuit 16 and the data circuit 17 scan the reflection metal films 7 and the transparent electrodes 10 of the LCD device 1 and realize the display, under the control of a control circuit 18 such as a micro processor, in accordance with display data.

Figure 5:
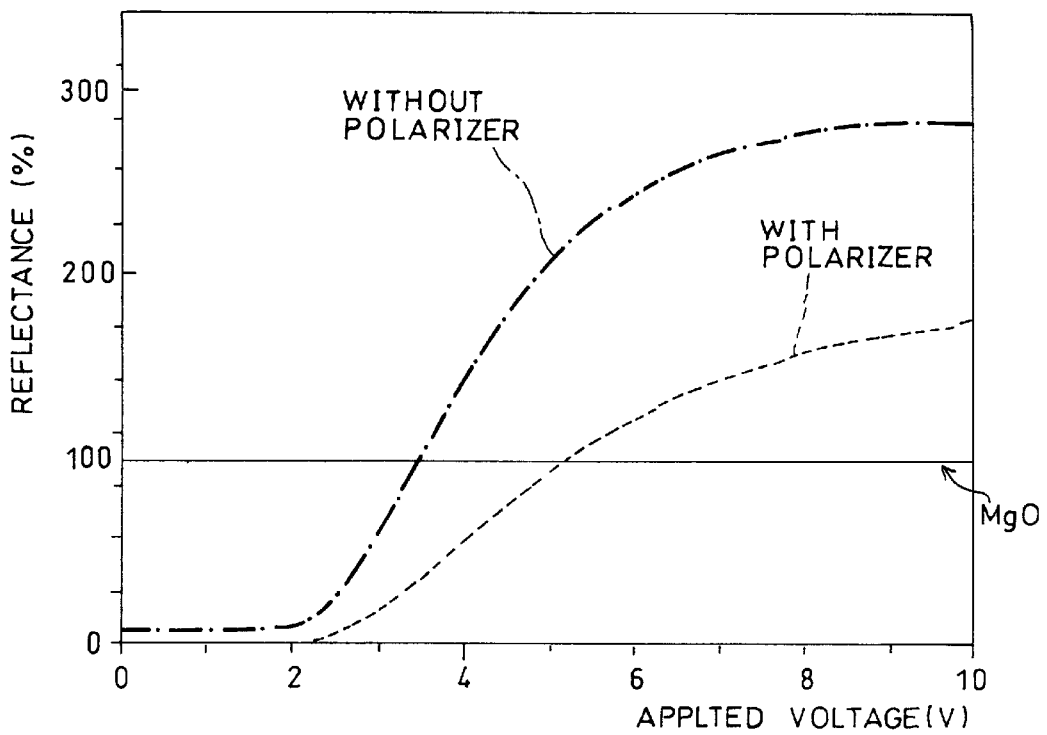
FIG. 5 is a graph illustrating a voltage-reflectance property of the LCD device.

FIG. 5 is a graph illustrating a voltage-reflectance property of the LCD device 1 in accordance with the present embodiment, and FIG. 6 shows a system for measuring optical properties of the LCD device. More specifically, in respect to an incident light which enters the LCD device 1 with a tilt at an angle of 30° with respect to a normal line of the LCD device 1, a reflectance in a direction of the normal line of the LCD device 1 with respect to the incident light was measured. As shown in FIG. 5, by arranging the LCD device 1 so that a complex of the nematic liquid crystal 14 and the liquid-crystalline polymers 15 is used as the liquid crystal layer 13, it exhibits saturation at a voltage of 8 V to 10 V, whereby the driving voltage for the LCD device 1 is set relatively lower. Note that a standard white plate made of oxide magnesium MgO was used as a member used as reference in measuring the reflectance and the contrast ratio. For comparison, FIG. 5 shows properties in the case where the polarizer 4 was omitted.

According to FIG. 5, when a voltage is applied, the reflectance in the normal line direction with respect to the light entering in the direction tilted at an angle of 30° with respect to the normal line of the LCD device 1 was at most 170 percent, and the maximum contrast ratio was 30.

On the other hand, the brightness when the polarizer 4 was omitted was 285 percent, while it was 170 percent when the polarizer 4 was provided. This result shows that the liquid crystal layer 13 diffuses the incident light when the incident light enters in a direction in parallel with the rubbing alignment direction on the light entering side, while allows the light to maintain its plane of polarization to some extent. In other words, in conventional arrangement conditions, half of the incident light is absorbed by the polarizer and hence the brightness is decreased to half or less, but by adjusting the arrangement conditions for the polarizer 4, a bright display can be realized without causing the brightness to decrease to half or less, even when the polarizer 4 is provided.

Figure 7A:
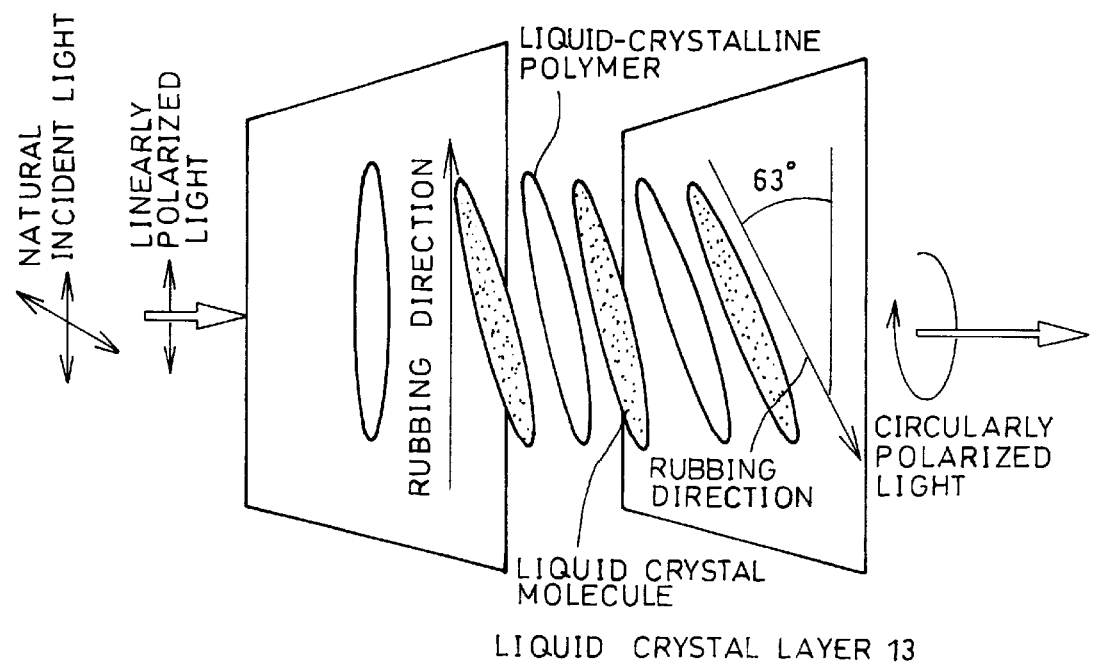
FIGS. 7(a) and 7(b) are schematic views showing the liquid crystal layer of the LCD device.
Figure 7B:
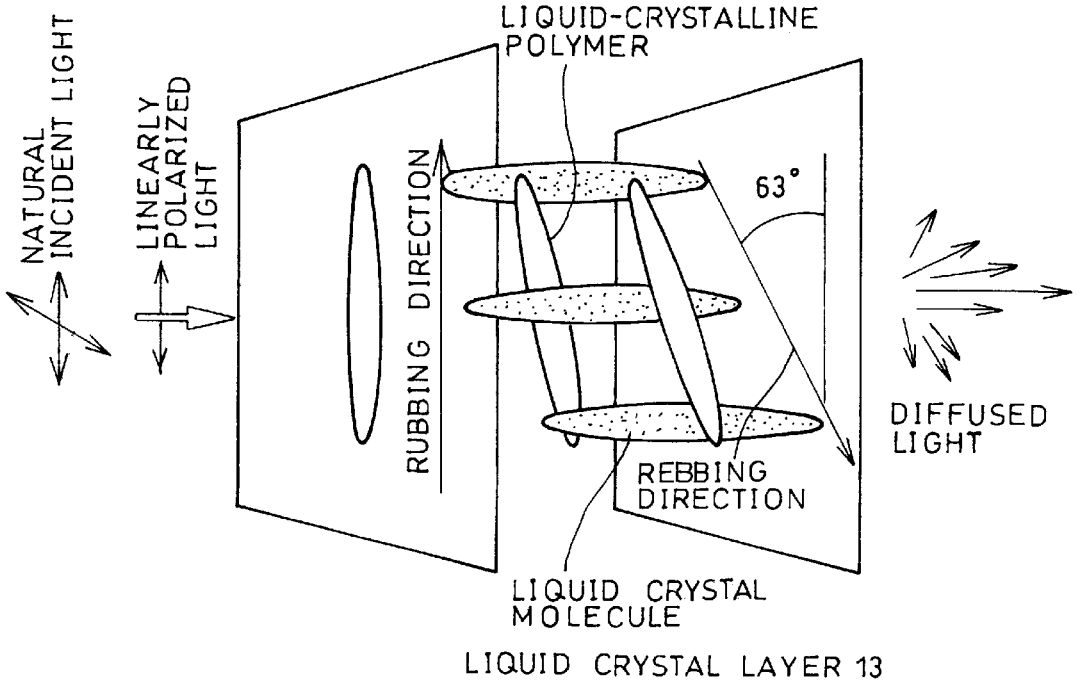

Schematic views showing the light diffusing states according to the above result are shown in FIGS. 7(*a*) and 7(*b*). In the state shown in FIG. 7(*a*), which is a state when no voltage is applied, the refractive indexes of the nematic liquid crystal 14 with respect to ordinary rays and extraordinary rays, and those of the cured liquid-crystalline polymers 15 are substantially equal, respectively. Therefore, the liquid crystal layer 13 shifts to a light transmitting state with a set desired retardation, and no diffusion is observed. In this case, the liquid crystal layer 13 functions in the same manner as in the case of the usual nematic liquid crystal 14 alone, and the light becomes circularly polarized light, as described later.

On the other hand, in the state shown in FIG. 7(*b*), which is a state when a voltage is applied, only the nematic liquid crystal 14 is aligned perpendicularly with respect to the transparent electrodes 10 (the reflection metal film), and hence the refractive index of the nematic liquid crystal 14 becomes close to a refractive index with respect to the ordinary rays. The liquid-crystalline polymers 15 do not respond to a voltage. Therefore, a difference between the refractive indexes of the nematic liquid crystal 14 and the liquid-crystalline polymers 15 becomes great. As a result, the liquid crystal layer 13 as the display element shifts to a light diffusing state, and the incident light is transmitted therethrough, thereby becoming diffused light and non-diffused light (linearly polarized light component). Since the diffused light diffused by the liquid crystal layer 13 is polarized to some extent as described above, most components of the non-diffused light and the diffused light are transmitted through the polarizer 4, and the display state of the present device becomes a so-called bright state. In this bright state, since the liquid crystal layer 13 is in a white-color diffusing state, a possibility of occurrence of the mixing reflection is less, and the so-called visibility is hardly impaired. A ratio of the non-diffused light and the diffused light is controllable, by adjusting the mixture ratio of the nematic liquid crystal 14 and the UV curable liquid crystal, or the difference between the refractive indexes of the same.

The following description will explain an operational mechanism of the LCD device 1 arranged so as to causes light diffusion as shown in FIGS. 7(*a*) and 7(*b*), while referring to FIGS. 8(*a*) and 8(*b*). When no voltage is applied (FIG. 8(*a*)), an incident light which is linearly polarized by the polarizer 4, and an incident angle of the light is set so that the light enters along directors of the liquid crystal molecules. In other words, the linearly polarized light having passed through the polarizer 4 from a side of the transparent substrate 2 enters the liquid crystal layer 13 which is twist-aligned through an angle of 63° between the upper and lower substrates 2 and 3. The linearly polarized light passes through the liquid crystal layer 13 twist-aligned through an angle of 63° has been converted to a circularly polarized light when it reaches the reflection metal films 7. Further, the reflection metal films 7 reflect it, causing it to become a circularly polarized light which circulates in a reverse direction. Subsequently, again passing through the liquid crystal layer 13 twist-aligned through an angle of 63°, the light becomes a linearly polarized light having a plane of polarization rotated through an angle of 90°, and is absorbed by the polarizer 4. Therefore, the display of the reflection-type LCD device 1 becomes a black display without diffusion of light. Besides, since the reflection metal films 7 having a mirror surface are used so as to function as a reflection surface, the polarization of the light is almost completely maintained, and an excellent black state is realized.

Such conversion of the polarized light can be realized under limited conditions, and this is reported in detail in "JAPAN DISPLAY 89", p. 192. The liquid crystal 13 is required to have optical properties such that: (1) a linearly polarized light becomes a circularly polarized light when it passes through the liquid crystal 13; and, (2) the circularly polarized light comes to have a phase shift of 180° at the reflection surface, and when passing through the liquid crystal 13 again, its plane of polarization rotates through an angle of 90°.

As a result of earnest studies, the inventors of the present invention confirmed that the combination of liquid crystal and a UV curable liquid crystal matrix satisfies the above requirements. More specifically, the UV curable liquid crystal becomes liquid-crystalline polymers when irradiated by ultraviolet, while maintaining the twist alignment at the same angle as that of the liquid crystal. Therefore, when no voltage is applied, it exhibits an excellent black state without diffusion. On the other hand, when a voltage is applied, only the liquid crystal is aligned perpendicularly with respect to the transparent electrodes 10 (the reflection metal film 7), and hence the refractive index of the liquid crystal becomes close to a refractive index with respect to the ordinary rays. On the other hand, cured liquid-crystalline polymers do not respond to a voltage. Therefore, a difference between the refractive indexes of the liquid crystal and the liquid-crystalline polymers becomes great. As a result, the liquid crystal layer as the display element shifts to a light diffusing state, and the incident light is transmitted therethrough, thereby becoming diffused light and non-diffused light (linearly polarized light component). Since the diffused light diffused by the liquid crystal layer is polarized to some extent as described above, most components of the non-diffused light and the diffused light are transmitted through the polarizer 4, and the display state of the present device becomes a so-called bright state. In this bright state, since the liquid crystal layer is in a white-color diffusing state, a possibility of occurrence of the mixing reflection is less, and the so-called visibility is hardly impaired. A ratio of the non-diffused light and the diffused light is controllable, by adjusting the mixture ratio of the liquid crystal and the UV curable liquid crystal, or the difference between the refractive indexes of the same. In short, the inventors of the present invention successfully made the liquid crystal layer 13 have the same diffusing function as that of the conventional diffusing reflection film, and controlled the diffusing property by using a voltage.

The phenomenon of diffusion by the liquid crystal layer 13 is peculiar to the combination of the liquid crystal and the liquid-crystalline polymer, and it does not occur to a combination of liquid crystal and non-liquid-crystalline polymer. Besides, all the polymerizable materials do not exhibit liquid-crystalline properties after being mixed with liquid crystal and polymerized by, for example, UV projection thereto. Therefore, by selecting not a usual polymerizable material but a material such as UV curable liquid crystal which becomes liquid-crystalline polymer when mixed with liquid crystal and polymerized, the liquid crystal layer 13 can be formed.

[Second Embodiment]

Figure 9:
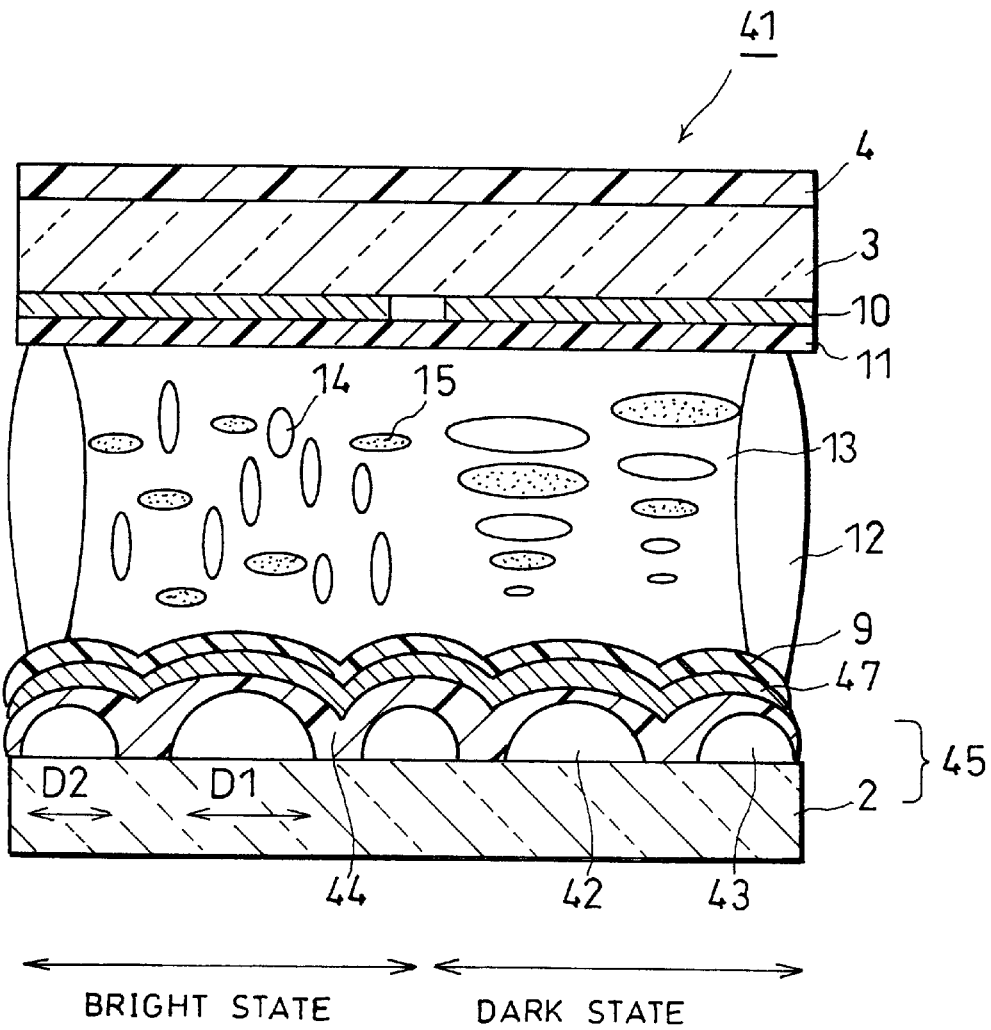
FIG. 9 is a cross-sectional view illustrating an arrangement of an LCD device in accordance with another embodiment of the present invention.

FIG. 9 is a cross-sectional view of a reflection-type LCD device 41 in accordance with a second embodiment of the present invention. The reflection-type LCD device 41 has substantially the same arrangement as that of the reflection-type LCD device 1 of the first embodiment, but is characterized in that a surface of the substrate 2 is formed smooth but uneven. In other words, the LCD device 41 is equipped with the transparent glass substrates 2 and 3. On the glass substrate 2, a plurality of large protuberances 42 and small protuberances 43 made of a synthetic resin material described later. A diameter D1 of the large protuberance and 42 a diameter D2 of the small protuberance 43 are set to 5 µm and 3 µm, respectively, and each space between D1 and D2 is set to at least 2 µm.

A smoothing film 44 is formed so as to cover the protuberances 42 and 43 and fill recessed parts between the protuberances 42 and 43. The smoothing film 44 has a surface smoothly curving, due to the protuberances beneath. On the smoothing film 44, reflection metal films 47 made of aluminum, nickel, chrome, silver, or the like are formed. These protuberances 42 and 43, the smoothing film 44, and the reflection metal films 47 on the glass substrate 2 constitute a reflection plate 45 as a light reflecting member. On the reflection metal films 47, an alignment film 9 is formed.

On a surface of the glass substrate 3 on a side to the glass substrate 2, transparent electrodes 10 made of ITO (indium tim oxide) or the like are formed, and the reflection metal films 47 and the transparent electrodes 10 constitute an electrode structure. An alignment film 11 is formed so as to cover the glass substrate 3 on which the transparent electrodes 10 are formed, and the glass substrates 2 and 3 facing vis-a-vis each other are sealed with a sealing member 12 (described later) applied to peripheral parts of the glass substrates 2 and 3. Liquid crystal which has the same composition as that of the first embodiment is injected between the alignment films 9 and 11 so as to form the liquid crystal layer 13. On a surface of the glass substrate 3 on a side opposite to the liquid crystal layer 13, a polarizer 4 with a transmittance of single piece of 48 percent is provided.

Figure 10A:
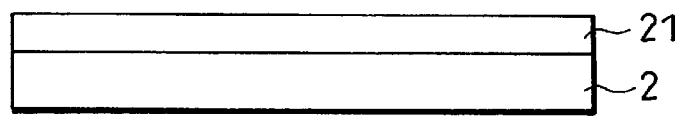
FIGS. 10(a) through 10(f) are cross-sectional views showing a process for manufacturing uneven reflection films of the LCD device.
Figure 10B:
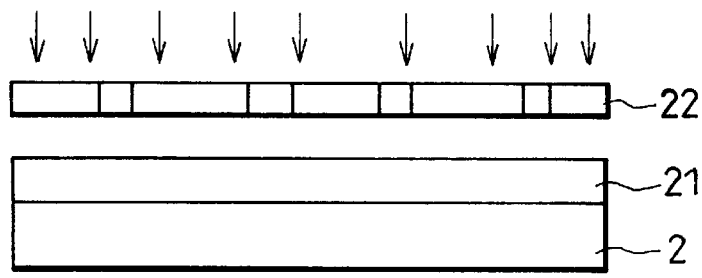

FIGS. 10(a) through 10(f) are cross-sectional views for explaining a manufacturing process of the reflection plate 45 shown in FIG. 9. As shown in FIG. 10(a), a surface of the glass substrate 2 (trade name: 7059, produced by Corning Co., Ltd.) is coated with a photosensitive resin material (for example, OFPR-800 (trade name) produced by Tokyo Ohka Kogyo Co., Ltd.) by the spin coating at 500 rpm to 3000 rpm, so as to form a resist layer 21. In the present embodiment, the resist film 21 is preferably formed so as to be 1.5 µm thick by the spin coating at 2500 rpm for 30 seconds.

Figure 10C:
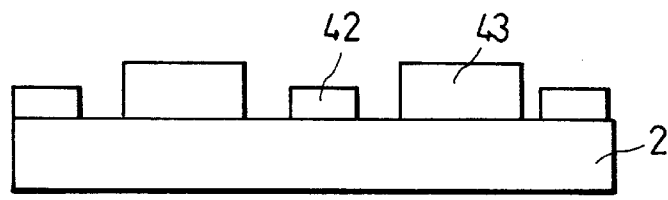

Subsequently, the glass substrate 2 on which the resist film 21 is formed is baked at 90° C. for 30 minutes. Then, it is subjected to exposure by using a photo mask 22 on which a plurality of large and small round patterns described later are formed, and then, it is subjected to development by using a developing liquid (for example, 2.38-percent solution of NMD-3 (trade name) produced by Tokyo Ohka Kogyo Co., Ltd.). As a result, large protuberances 42 and small protuberances 43 which differ in heights are formed on the surface of the glass substrate 2, as shown in FIG. 10(c). The aim of forming protuberances of two or more types differing in heights is to avoid coloring of reflected light due to interference between light reflected by tops of the protuberances and light reflected by recessed parts between the protuberances. The photo mask 22 is arranged so that round patterns with a diameter D1 (for example, 5 µm) and round patterns with a diameter D2 (for example, 3 µm) are positioned at random, with each gap therebetween of at least 2 µm.

Figure 10D:
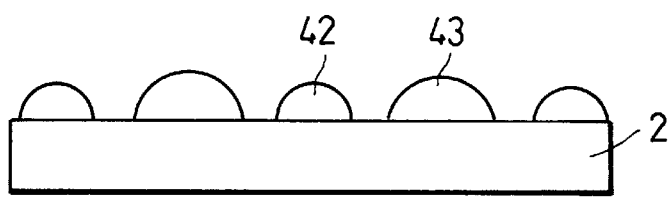
Figure 10E:
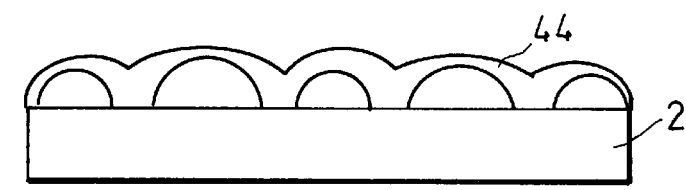

Subsequently, the glass substrate 2 shown in FIG. 10(c) is heated at 200° C. for one hour so that tops of the protuberances 42 and 43 are melted to some extent so as to be rounded. Then, as shown in FIG. 10(e), the glass substrate 2 shown in FIG. 10(d) is coated with the same material as the aforementioned photosensitive resin material by the spin coating at 1000 rpm to 300 rpm. In the present embodiment, the spin coating was carried out at 2000 rpm. By doing so, recessed parts between the protuberances 42 and 43 were filled with the material, and the smoothing film 44 was made to have a smooth surface relatively gently curving.

Figure 10F:
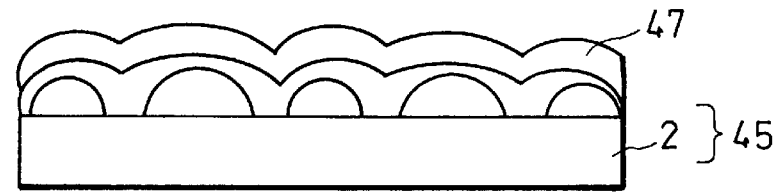

Thereafter, as shown in FIG. 10(f), a metal thin film made of aluminum, nickel, chrome, or silver is formed on the surface of the smoothing film 44 so as to be about. 0.01 µm to 1.0 µm thick. In the present embodiment, the reflection metal films 47 are formed by sputtering aluminum. Thus, the reflection member 45 is formed.

By using the reflection member 45 produced through the process shown by FIGS. 10(a) through 10(f), the liquid crystal element is produced. Polyimide resin films are formed on the glass substrates 2 and 3, and the glass substrates 2 and 3 are baked at 200° for one hour. Then, a rubbing operation is applied thereto so as to align the liquid crystal layer 13. By doing so, the alignment films 9 and 11 are formed. The sealing member 12 to be applied to the glass substrates 2 and 3 is formed by, for example, screen printing of an adhesive sealing material in which spacers with a diameter of 0.2 µm are mixed. On combining the glass substrate 2 having the reflection member, and the glass substrate 3 having the transparent electrodes 10 and the alignment 11, spacers with a diameter of 1.5 µm are scatteringly provided between the glass substrates 2 and 3, so that the thickness of the liquid crystal layer 13 is adjusted. The same material as that in the first embodiment is used for the liquid crystal layer 13. Thereafter, exposure to ultraviolet is conducted, so that phase separation between the nematic liquid crystal 14 and the liquid crystal polymers 15 is achieved. Thus, the LCD device 41 shown in FIG. 9 is manufactured.

When a voltage was applied to the LCD device thus formed in accordance with the present embodiment, the reflectance in the normal line direction of the LCD device 41, with respect to the light which has entered in the direction tilted at an angle of 30° with respect to the normal line of the LCD device 41, was at most 120 percent, and the maximum contrast ratio was 20. Here, a standard white plate made of oxide magnesium MgO was used as a member used as reference in measuring the reflectance and the contrast ratio. The operational mechanism of the liquid crystal 13 is the same as that in the first embodiment. In the case of the present embodiment, in addition to the diffusing property of the reflection plate 45, diffusion by the liquid crystal 13 also contributes to the brightness of the display. Therefore, there is an advantage that the height of the protuberances may be set to be 0.5 µm or less, which is less than the height of the conventional reflection plate. Compared with the first embodiment, there is an advantage that an angle of visibility is greater, though the brightness and contrast are inferior.

In the reflection-type LCD device 41, since the reflection metal films 47 of the reflection plate 45 are provided on a surface on a side to the liquid crystal layer 13, a parallax which occurs when observing the LCD device 41 is eliminated, and as a result an excellent display can be obtained. Furthermore, in the case where the LCD device 41 is driven by the active-matrix driving scheme, the reflection metal films 47 may be used as pixel electrodes connected to thin film transistors as switching elements or non-linear elements having an MIM (metal-insulating film-metal) structure, but it has been confirmed that even in such a case, excellent display performance as described above can be achieved.

It has been also confirmed that in lieu of the glass substrate 2 in the present embodiment, other opaque substrates such as silicon substrates may be used so as to achieve similar effects. In the case where such a silicon substrate is used in lieu of the glass substrate 2 in the present embodiment, there is an advantage that circuit elements such as the scanning circuit 16, the data circuit 17, and the control circuit 18 can be integrated on the silicon substrate.

[Third Embodiment]

The following description will explain an embodiment wherein nematic liquid crystal (for example, SD-4107 (trade name) produced by Chisso Corporation) twist-aligned through an angle of 193° between the glass substrates 2 and 3 is used as the liquid crystal layer. The other constituent members are the same as those shown in FIG. 1. Upper and lower alignment films 9 and 10 made of SE-150 (produced by Nissan Chemical Industries, Ltd.) are provided on surfaces of the substrates 2 and 3, and a rubbing operation is applied thereto. By filling a gap between the substrates 2 and 3 with (1) SD-4107 (trade name of a product produced by Chisso Corporation) which serves as the nematic liquid crystal 14 having a positive dielectric anisotropy to which an appropriate quantity of left-handed twist chiral dopant S-811 (produced by Merck Japan Ltd.) is added, and (2) UV curable liquid crystal, a liquid crystal layer 13 is formed to a thickness of 2.2 $\mu$m between the substrates 2 and 3. The LCD device is thus produced. The liquid crystal layer 13 is left-handed twist-aligned through an angle of 193° when no voltage is applied.

When the LCD device thus arranged was driven by the multiplex driving scheme at 1/480 duty, it shifted to a normally black mode, and a contrast ratio of 30:1 was obtained when observing from the front. Moreover, in the case where an incident angle was not more than 20° in vertical and horizontal directions, the contrast ratio was not lower than 5:1. Thus, an extremely high angle-of-visibility dependency was obtained. Besides, in the LCD device thus arranged, acuteness of electro-optical properties was promoted, thereby making it possible to drive the LCD device by the simple matrix driving. As in the first embodiment, the dark state without diffusion and the bright state which is a diffusing state are realized in the present embodiment as well. In addition, a reflectance was measured when a predetermined voltage for application to selected pixels is actually applied to the selected pixels, and an extremely high reflectance of 132 percent was obtained. Furthermore, since the reflection films are arranged so as to have mirror surfaces (the reflection metal films 7), the liquid crystal layer has a uniform thickness, thereby being suitable for the simple matrix driving.

[Fourth Embodiment]

The following description will explain a fourth embodiment wherein nematic liquid crystal (for example, ZLI-1565 (trade name) produced by Merck Japan Ltd.) twist-aligned through an angle of 45° between the glass substrates 2 and 3 is used as the liquid crystal layer. Here, the cell thickness is set to 2.0 $\mu$m, and the other constituent components are the same as those shown in FIG. 1. Upper and lower alignment films 9 and 11 made of SE-150 (produced by Nissan Chemical Industries, Ltd.) are provided on surfaces of the substrates 2 and 3, and a rubbing operation is applied thereto. By filling a gap between the substrates 2 and 3 with (1) ZLI-1565 (produced by Merck Japan Ltd.), which is nematic liquid crystal 14 having a positive dielectric anisotropy to which an appropriate quantity of left-handed twist chiral dopant S-811 (produced by Merck Japan Ltd.) is added, and (2) UV curable liquid crystal, the liquid crystal layer 13 is formed 2.2 $\mu$m thick between the substrates 2 and 3. The LCD device is thus produced. The liquid crystal layer 13 is left-handed twist-aligned through an angle of 45° when no voltage is applied. In the present embodiment, in the optical arrangement shown in FIG. 3, $\beta$ and $\theta$ are set to 22.5° and 45°, respectively.

Figure 11:
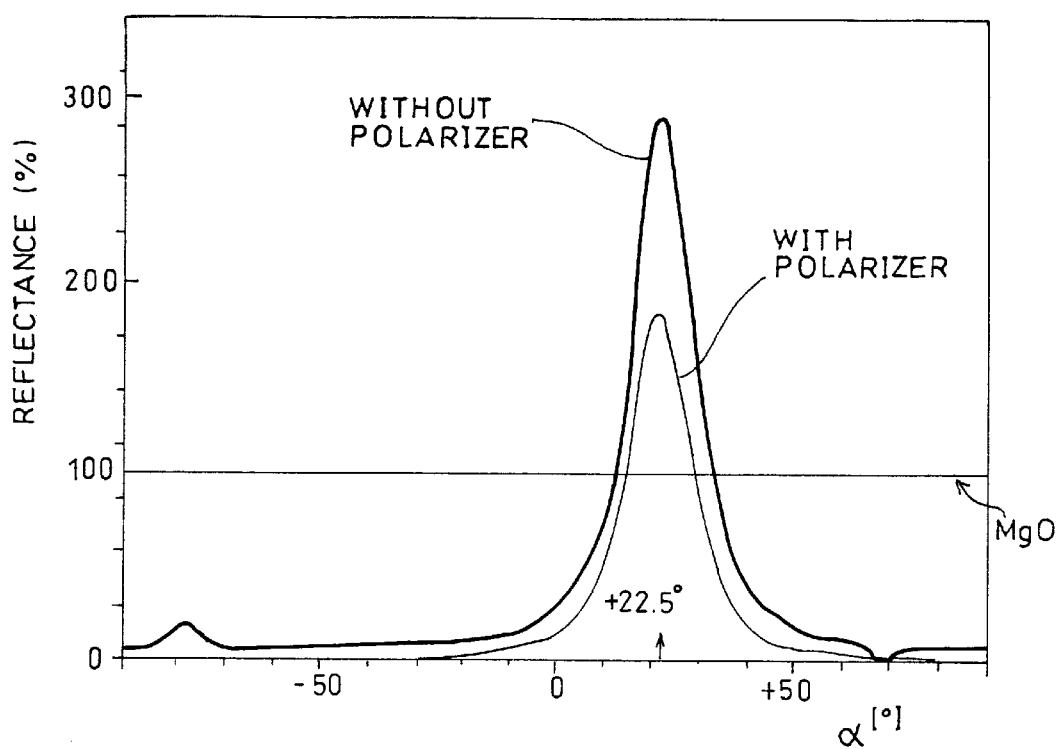
FIG. 11 is a graph showing in-plane direction dependency in a bright state of the LCD device.

A reflectance of the LCD device thus arranged, in an in-plane direction a in the bright state, was measured by using an optical system shown in FIG. 6, and results of the measurement is shown in FIG. 11. Note that an upward direction orthogonal to the rubbing axis R1 is given as a direction when $\alpha$ is 0°. In FIG. 11, a result when the polarizer 4 was provided and a result when the polarizer 4 was omitted are both shown. From the figure, it is clear that the brightness becomes highest when $\alpha$ is 22.5°, which is half of the twist angle of 45°. Besides, even when the polarizer 4 was provided, the reflectance exceeded ½ in some cases, depending on directions. Thus, it has been found that even in such cases, the bright display could be achieved. Therefore, by placing the observer in this range of positions, drastically bright display can be obtained.

When the LCD device was driven, the device had a normally black display, and a contrast ratio of 30:1 was obtained when observing from the front. Besides, by the same mechanism as that in the first embodiment, the dark state without diffusion and the bright state with diffusion were realized.

[Fifth Embodiment]

The following description will explain a fifth embodiment wherein nematic liquid crystal 14 (for example, ZLI-1565 (trade name) produced by Merck Japan Ltd.) twist-aligned through an angle of 80° to 95° and the UV curable liquid crystal, sealed between the glass substrates 2 and 3, is used as the liquid crystal layer, and a light compensation plate 72 is inserted between the polarizer 4 and the liquid crystal layer 13. The other constituent components are the same as those in the first embodiment.

Figure 12:
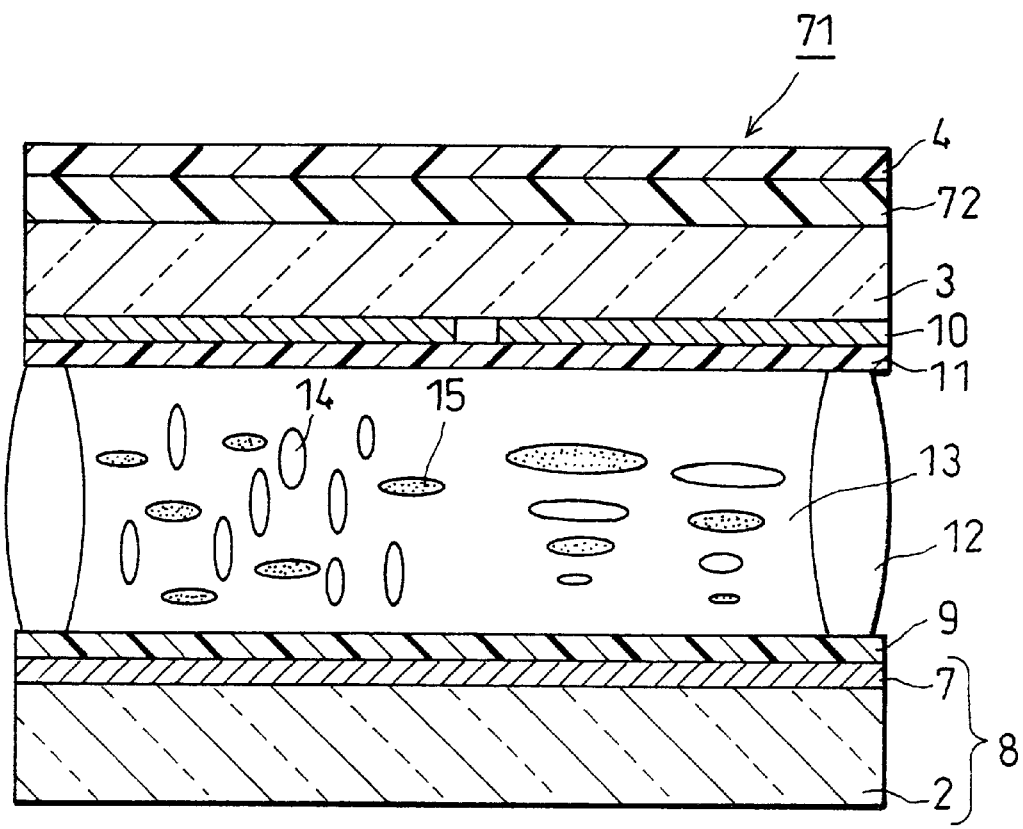
FIG. 12 is a cross-sectional view illustrating an arrangement of an LCD device in accordance with still another embodiment of the present invention.

FIG. 12 illustrates an LCD device 71 in accordance with the present embodiment. A liquid-crystalline composite resulting on mixing (1) ZLI-1565, which is nematic liquid crystal 14 having a positive dielectric anisotropy to which an appropriate quantity of left-handed twist chiral dopant S-811 (produced by Merck Japan Ltd.) is added, and (2) UV curable liquid crystal, at a mixture ratio by weight of 85:15, is filled in a gap between the substrates 2 and 3, so as to have a thickness of 2 $\mu$m. Thereafter, ultraviolet is projected thereto, and phase separation between the nematic liquid crystal 14 and the liquid-crystalline polymers 15 is conducted. The liquid crystal layer 13 is thus produced.

Figure 13:
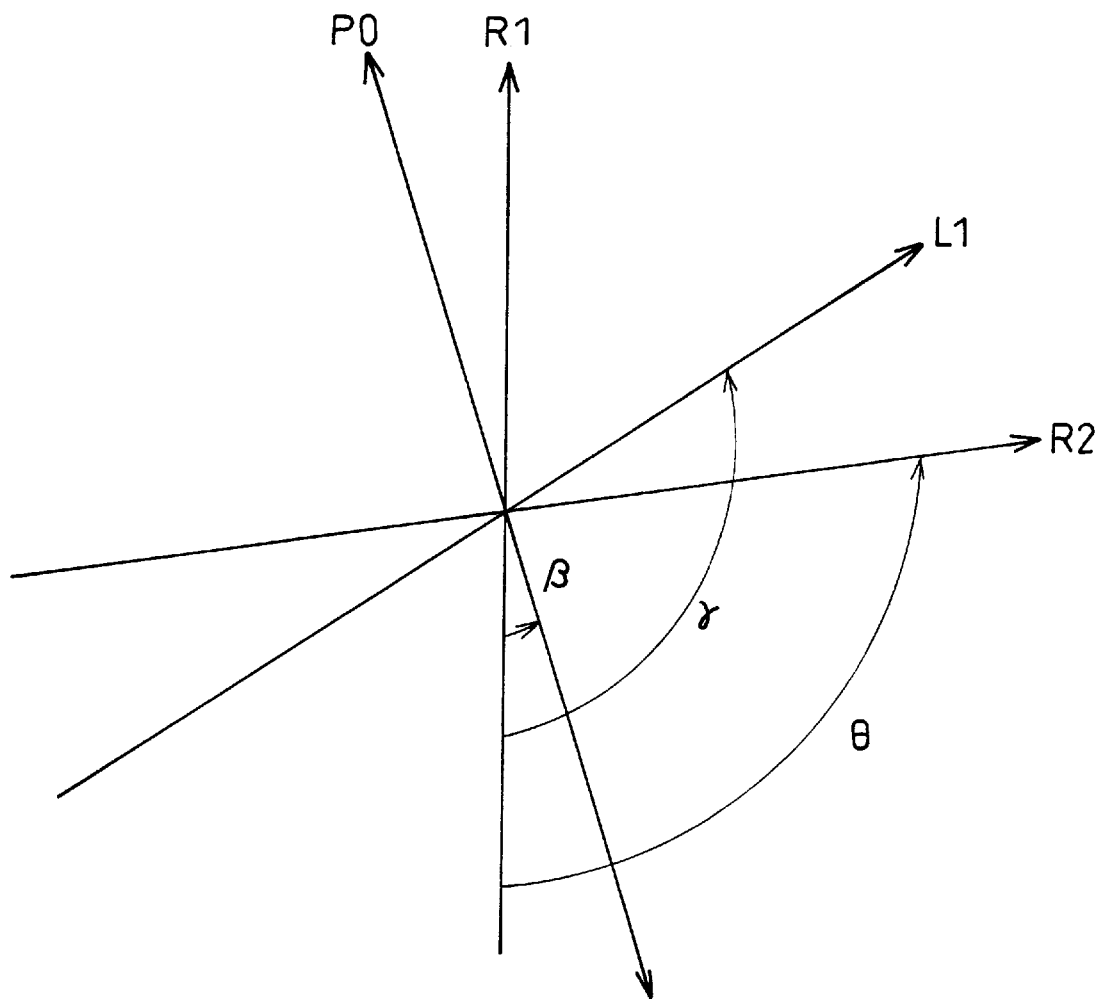
FIG. 13 is an explanatory view illustrating an optical arrangement of the LCD device.

Here, the following description will explain the present embodiment by taking as examples the case where the liquid crystal layer 13 is left-handed twist-aligned through an angle of 80° and the case where the angle is 95°. The manufacturing method of the liquid crystal 13 is the same as that in the first embodiment. On the upper substrate 3 of the driving cell thus obtained, the light compensation plate 72 is formed on the upper substrate 3 by combining phase difference plates (R=160 nm and 150 nm) which is made by drawing polycarbonate in one specific direction, thereby having a drawing axis (a slow axis) directed in the drawing direction. The LCD display 71 is thus formed. Requirements of the liquid crystal layer in the case of the 80°-twist alignment and in the case of the 95°-twist alignment are shown as follows. Here, the optical structure of the polarizer 4, the light compensation plate 72 (an optical phase compensation film), and the liquid crystal layer 13 in the LCD device 71 thus arranged is adjusted as shown in FIG. 13. Note that in FIG. 13 a direction of the slow axis of the light compensation plate 72 is indicated by L1, and an angle in the anti-clockwise direction of the direction L1 of the slow axis with respect to an alignment direction r1 of the liquid crystal molecules on a side to the upper substrate 3 is indicated as γ.

TABLE 1

| A: 80° TWIST | |
| --- | --- |
| Δnd OF LIQUID CRYSTAL LAYER | 0.202 μm |
| Δnd OF OPTICAL PHASE DIFFERENCE FILM | 0.160 μm |
| β | 0° |
| γ | 8° |
| B: 95° TWIST | |
| Δnd OF LIQUID CRYSTAL LAYER | 0.200 μm |
| Δnd OF OPTICAL PHASE DIFFERENCE FILM | 0.150 μm |
| β | 0° |
| γ | 15° |

Figure 14:
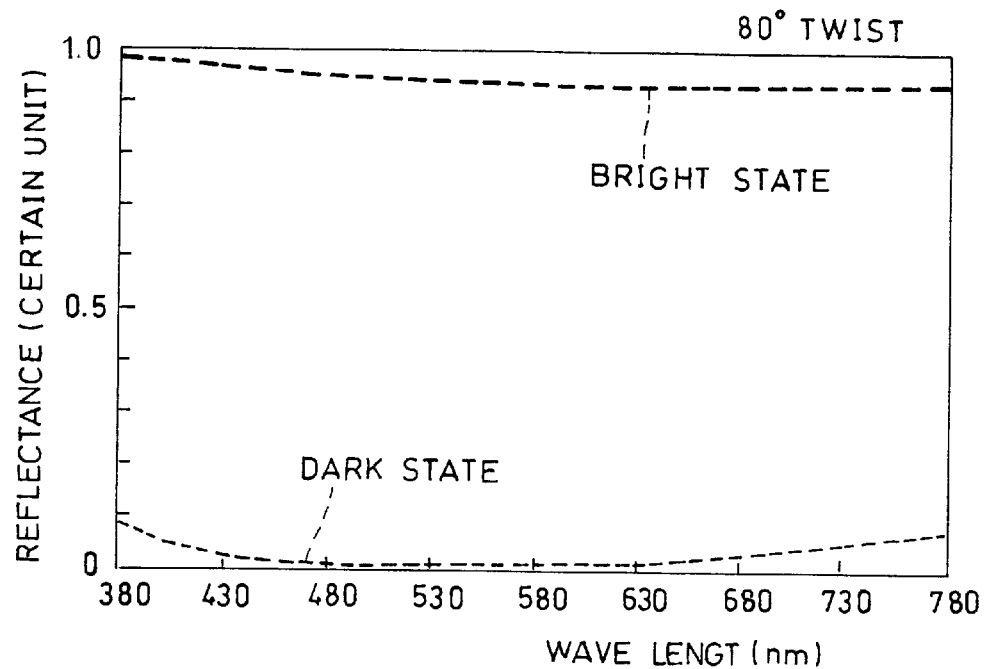
FIGS. 14(a) and 14(b) are graphs showing wavelength-reflectance properties of the LCD device.
Figure 14:
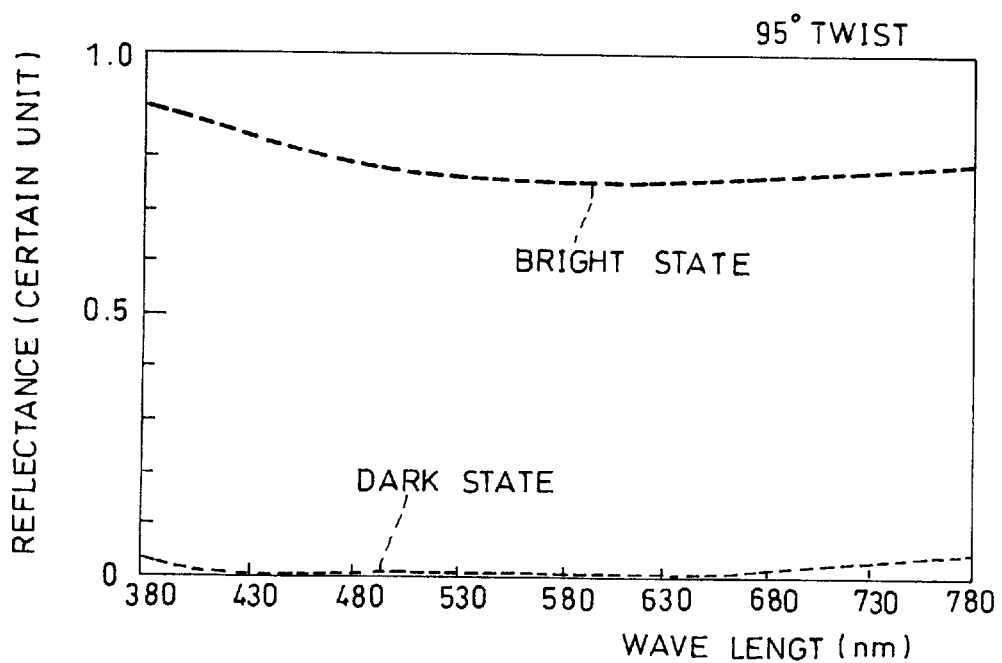

FIGS. 14(a) and 14(b) are graphs showing spectral characteristics in a transverse direction of the reflection-type LCD device 71 when no voltage is applied and when a voltage is applied. FIG. 14(a) shows a case where the liquid crystal layer 13 is twist-aligned through an angle of 80°, and FIG. 14(b) shows a case where the liquid crystal layer 13 is twist-aligned through an angle of 95°. As shown in these graphs, by providing the light compensation plate 72, reflection on a shorter wavelength side and reflection on a longer wavelength side were made small, thereby resulting in that excellent bright/dark display could be realized. On the other hand, it has been confirmed that when a voltage is applied, excellent diffusion is exhibited, due to the same mechanism as that in the first embodiment.

In the present embodiment, oriented films made of polycarbonate are used as the light compensation plate 72, but the present invention is not limited to this. For example, oriented films such as those made of polyvinyl alcohol (PVA) or polymethylmethacrylate (PMMA) may be used. Furthermore, optically biaxial films with refractive indexes varied in a thickness direction, or polymeric liquid crystal films are applicable to the present invention.

When the LCD device thus arranged was driven by the static driving scheme, it shifted to a normally black mode, and a contrast ratio of 30:1 was obtained when observing from the front.

In the reflection-type LCD device 71 of the present embodiment, since the reflection metal films 7 of the reflection plate 8 are provided on a surface on a side to the liquid crystal layer 13, a parallax which occurs when observing the LCD device 71 is eliminated, and as a result an excellent display can be obtained.

Moreover, in the present embodiment, the case where the twist angle of the liquid crystal layer 13 is 80° and the case of 95° are shown as examples, but the present invention is not limited to these, and any liquid crystal material with any twist angle is applicable to the present invention provided that the liquid crystal material can constitute a liquid crystal layer characterized in that retardation is controlled by an electric field.

Furthermore, a nematic compensation-use liquid crystal cell in which liquid crystal molecules are arranged in a spray form may be used as a light compensation plate (a phase difference plate), in lieu of the light compensation plate 72 made of polycarbonate in the present embodiment. The compensation-use liquid crystal cell used here has alignment films formed by oblique vapor-deposition of SiO with respect to the upper and lower glass substrates. Both pre-tilt angles of the upper and lower substrates are 45°, while tilt directions (substrate plane directions) of the upper and lower substrates are different, with an angle of 180° therebetween. Between the substrates thus arranged, ZLI-2293 (produced by Merck Japan Ltd.) which is nematic liquid crystal having a positive dielectric anisotropy is sealed as a liquid crystal layer. The liquid crystal layer is about 2.5 μm thick. Retardation in a cell normal direction of the compensation-use liquid crystal cell was measured by the interference method, and it was found to be 160 nm. Furthermore, the compensation-use liquid crystal cell and liquid crystal molecules are arranged so as to have tilt orientations (substrate plane orientations) coincident with the direction of the slow axis of the phase difference plate shown in FIG. 13. As the light compensation plate, films in which liquid-crystalline polymers are twist-aligned are also applicable to the present invention.

[Sixth Embodiment]

Figure 15:
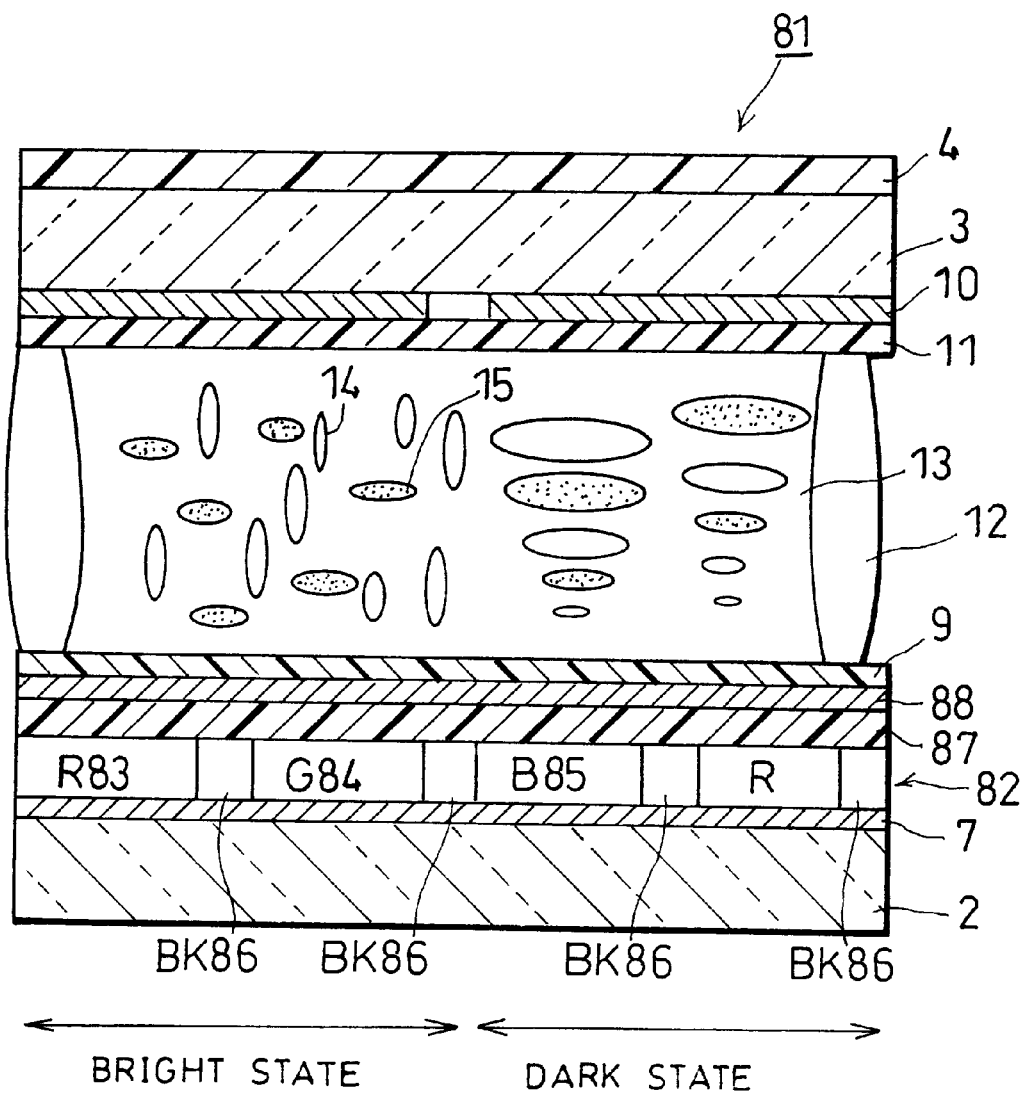
FIG. 15 is a cross-sectional view illustrating an arrangement of an LCD device in accordance with still another embodiment of the present invention.
Figure 16:
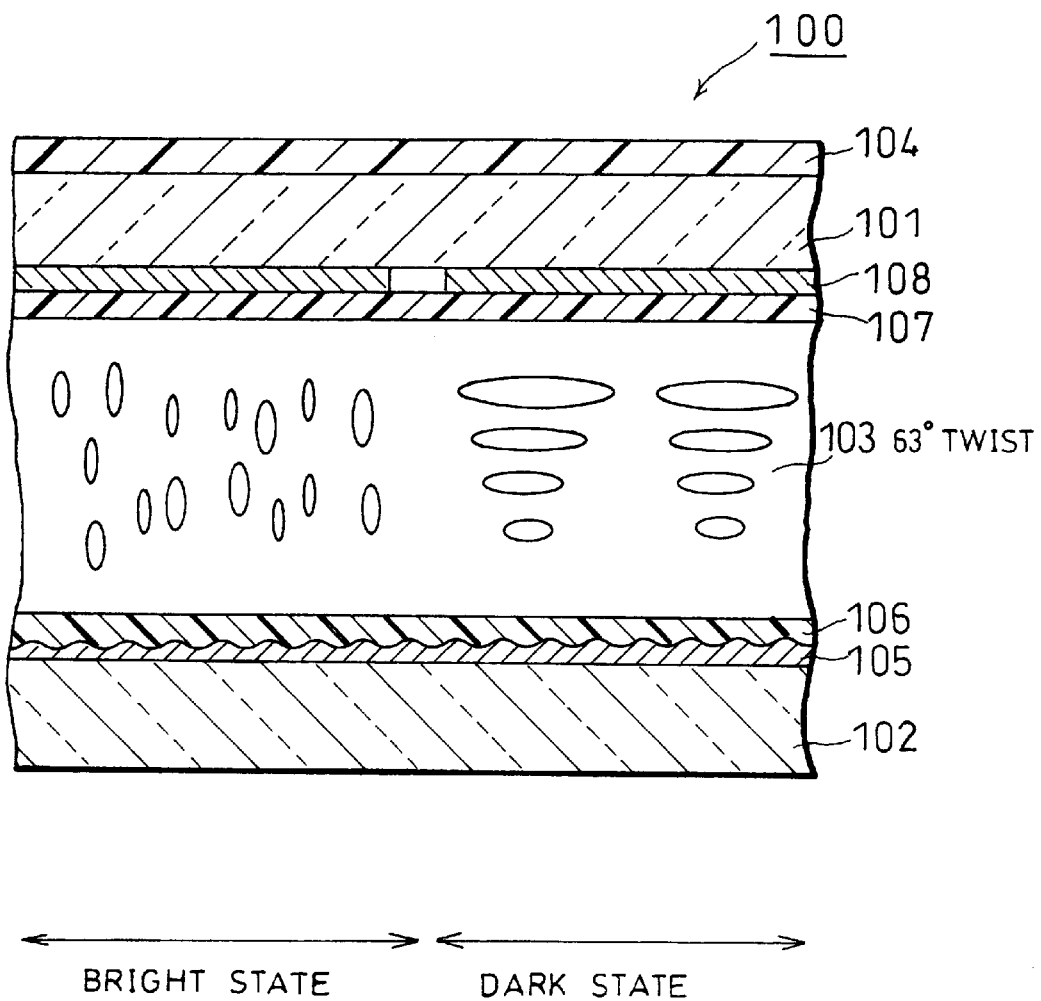
FIG. 16 is a cross-sectional view illustrating an arrangement of a conventional LCD device.

The following description will explain an embodiment wherein as a reflection-type LCD device 81 shown in FIG. 15, a color filter layer 82 which transmits red, green, and blue lights, is provided on the reflection metal films 7 of the glass substrate 2. The reflection-type LCD device 81 is arranged in substantially the same manner as the reflection-type LCD device 1 of the first embodiment is, but the LCD device 81 is characterized in that a color filter layer 82 of a pigment-dispersion type which transmits red, green, and blue lights is provided on the reflection metal films 7 of the glass substrate 2. In the color filter layer 82, red, green and blue color filters 83, 84, and 85 are provided at positions corresponding to a dot for red color, a dot for green color, and a dot for blue color, respectively, in each pixel. The red, green, and blue color filters 83, 84, and 85 are provided in a stripe form, and a black matrix 86 is provided between the color filters, in parallel with them. Then, a flattening film 87 is formed on the color filter layer 82, and transparent electrodes 88 are formed thereon so as to serve as display electrodes. The liquid crystal layer 13 is formed so as to have the same structure as that in the first embodiment.

In the present embodiment, the color filter layer 82 was formed as follows by applying the pigment dispersion method. First, a photosensitive resist in which a red pigment was evenly dispersed was sprayed over the reflection metal films 7 on the glass substrate 2. Here, CR2000 produced by Fuji Film Olin Co., Ltd. was formed so as to be 2.0 μm thick by the spin coating at 650 rpm. Thereafter, it was pre-baked at 80° C., and exposure with the use of a predetermined mask, and then, development were carried out. Finally, it was baked at 220° C. for 30 minutes. Thus, red patterns were formed. Further, green, blue, and black patterns were also formed through the same process by using CG2000, CB2000, and CK2000 produced by Fuji Film Olin Co., Ltd. The color filter layer 82 was thus formed.

According to the present embodiment, by forming the color filter layer on one substrate, the multi-color or full-color display having a wide color reproduction range is realized.

Besides, the present embodiment is described by taking as an example the case of absorption-type color filters, but organic volume hologram optical color filters or inorganic dichroic mirrors as light-reflection-type color filters are applicable in lieu of the reflection metal films 7. In this case, however, an absorption layer is preferably provided behind the color filters of the light reflection type.

Besides, it was confirmed that the same effect could be achieved in the case where the light-absorption-type color filter layer 82 was provided on the substrate 3.

As has been described, the reflection-type LCD display device of the present invention is characterized in comprising (1) at least one polarizer provided on a light entering side of a liquid crystal element, (2) an insulating substrate having transparent electrodes, (3) a light reflecting member having a light reflecting surface on one side thereof, and (4) a liquid crystal layer provided between the insulating substrate and the light reflecting member, in which liquid crystal molecules and liquid-crystalline polymers are twist-aligned through a same angle, wherein (i) for a dark display, linearly polarized light having a first plane of polarization enters and becomes circularly polarized light at the reflection surface, and after being reflected, it becomes linearly polarized light having a second plane of polarization when outgoing, the second plane of polarization being the first plane of polarization rotated through an angle of 90°, and (ii) for a bright display, linearly polarized light enters, and diffused light composed of the same polarized light components as those of the incident light outgoes, only the components having been allowed to pass.

With the above arrangement wherein a complex of liquid crystal and liquid-crystalline polymers is used for the liquid crystal layer provided between one polarizer and the light reflecting member, a driving voltage can be set relatively lower, and a resultant LCD device features no occurrence of "mixing reflection" due to a nebular state of the polymer-dispersed liquid crystal in the bright state even though electrodes on one side are reflection electrodes. Moreover, the LCD device causes no parallax, and has a wide angle of visibility and sufficient brightness without inappropriate coloring.

Furthermore, since the liquid-crystalline polymers and the liquid crystal molecules are twist-aligned through the same angle, the liquid crystal layer is capable of conversion from linearly polarized light to circularly polarized light and vice versa, like in the case where the liquid crystal layer is composed of only liquid crystal molecules. As a result, a clear black display can be realized, and contrast of the reflection-type LCD device can be enhanced.

Thus, since the reflection-type LCD device uses a relatively low voltage and does not require a backlight, an effect that the LCD device consumes less power and has superior visibility, as compared with an LCD device with a backlight, is achieved.

In the above arrangement, the liquid crystal molecules and the liquid-crystalline polymers preferably have substantially same refractive indexes with respect to extraordinary rays, and substantially same refractive indexes with respect to ordinary rays. With this, the liquid crystal layer is surely made to have a function for not diffusing light in the dark display while diffusing light in the bright display.

Furthermore, the light reflecting surface of the light reflecting member is preferably a smooth and uneven surface, or a flat mirror surface. In the case where it is a flat mirror surface, brightness and contrast of the display are enhanced since the incident light is reflected with the polarization substantially completely maintained. Note that in the bright display, no "mixing reflection" occurs even though the surface is flat, since the liquid crystal layer diffuses light.

On the other hand, in the case where the surface is uneven, the liquid crystal layer and the light reflecting member both diffuse light. Therefore, protuberances can be made not as high as those of a conventional uneven reflection plate, and hence contrast of the reflection-type LCD device can be improved. Furthermore, as compared with the case where the light reflecting member is flat and diffusion is caused only by the liquid crystal layer, retardation of the liquid crystal layer can be lessened. Therefore, the angle of visibility of the reflection-type LCD device can be made greater.

Furthermore, the light reflecting film constituting the light reflecting surface of the light reflecting member is preferably provided on a side of the light reflecting member to the liquid crystal layer. By doing so, a good display without a parallax can be obtained, as compared with the case where a transparent substrate is used as the substrate of the light reflecting member and a light reflection film is provided on a side opposite to the liquid crystal layer.

In addition, the light reflecting surface may be composed of surfaces of electrodes facing the transparent electrodes on the insulating substrate.

Incidentally, as for the arrangement of the polarizer and the liquid crystal molecules, a transmission axis of the polarizer and an alignment direction of the liquid crystal molecules on a light entering side are set so that an angle therebetween is about 90°, or so as to be substantially parallel. More preferably, the transmission axis of the polarizer is tilted with respect to the alignment direction of the liquid crystal molecules on the light entering side, at an angle of 75° to 105°, or 165° to 195° in an anti-clockwise direction. With this, in the dark display, diffusion or reflection of the incident light can be suppressed, and as a result a clear black display can be realized.

Furthermore, the transmission axis of the polarizer is preferably set in a substantially same direction as an alignment direction of the liquid crystal molecules positioning in the middle in a thickness direction of the liquid crystal layer. More specifically, the transmission axis of the polarizer is tilted to the alignment direction of the liquid crystal molecules positioning in the middle in the thickness direction of the liquid crystal layer, at an angle of −15° to +15° in an anti-clockwise direction. As a result, the reflectance in the bright display becomes greater than that in conventional cases (½), even though the polarizer is provided. Thus, a remarkably bright display can be realized.

In addition to the aforementioned components, the LCD device is desirably equipped with at least one optical phase compensating member, provided between the polarizer and the liquid crystal layer. With this arrangement, the reflection on a shorter wavelength side and the reflection on a longer wavelength side can be made smaller.

Moreover, the optical phase compensating member is preferably a polymer oriented film or ultraviolet curable liquid-crystalline polymers.

Furthermore, to realize multi-color or full-color display by utilizing the reflection-type LCD device, a light-absorption-type color filter layer may be provided on the light reflecting surface of the light reflecting member, or on the insulating substrate. Alternatively, instead of the light reflecting surface of the light reflecting member, an organic or inorganic reflection-type color filter layer may be formed, with an absorption layer provided behind the reflection-type color filter layer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reflection-type liquid crystal device, comprising:
   an insulating substrate having transparent electrodes thereon;
   a light reflecting member having a light reflecting surface on one side thereof;
   a liquid crystal layer sealed between said insulating substrate and substrate and said light reflecting member; and
   at least one polarizer provided on a light entering side to said liquid crystal layer,
   wherein:
   said liquid crystal layer includes liquid crystal molecules and liquid-crystalline polymers that are twist-aligned at a same angle;
   for a dark display, incident light which is linearly polarized by said polarizer to have a first plane of polarization is converted to circularly polarized light and reaches said reflection surface, and then, the light reflected by said reflection surface is converted to linearly polarized light having a second plane of polarization when outgoing to said polarizer, the second plane of polarization being said as the first plane of polarization rotated through an angle of 90°; and
   for a bright display, the light is diffused when outgoing, with the first plane of polarization substantially maintained.

2. The reflection-type liquid crystal display device as set forth in claim 1, wherein said liquid crystal molecules and said liquid-crystalline polymers have substantially same refractive indexes with respect to extraordinary rays, and substantially same refractive indexes with respect to ordinary rays.

3. The reflection-type liquid crystal display device as set forth in claim 1, wherein the liquid-crystalline polymers are ultraviolet curable liquid-crystalline polymer, which is polymerized and cured by UV light.

4. The reflection-type liquid crystal display device as set forth in claim 3, wherein a ratio by weight of the ultraviolet curable liquid-crystalline polymers to a sum of the ultraviolet curable liquid-crystalline polymers and said liquid crystal molecules is about 15 percent.

5. The reflection-type liquid crystal display device as set forth in claim 1, wherein said light reflecting surface of said light reflecting member is smooth and uneven.

6. The reflection-type liquid crystal display device as set forth in claim 5, wherein said light reflecting surface is made uneven by providing at random thereon protuberances of a plurality of types differing in height.

7. The reflection-type liquid crystal display device as set forth in claim 5, wherein said light reflecting member further includes:
   a substrate having on one side thereof protuberances of a plurality of types differing in height, the protuberances being provided at random, a surface on the side constituting said light reflecting surface; and
   a smoothing film formed so as to cover the protuberances.

8. The reflection-type liquid crystal display device as set forth in claim 1, wherein said light reflecting surface of said light reflecting member is a flat mirror surface.

9. The reflection-type liquid crystal display device as set forth in claim 8, wherein:
   said liquid crystal layer has a twist angle such that said liquid crystal layer has a super twisted nematic structure; and
   said transparent electrodes, and counter electrodes provided so as to face said transparent electrodes with said liquid crystal layer therebetween, are arranged so that said reelection-type liquid crystal display device is driven by a simple matrix driving method.

10. The reflection-type liquid crystal display device as set forth in claim 1, wherein said light reflecting surface of said light reflecting member is a light reflecting film provided on a side of said light reflecting member to said liquid crystal layer.

11. The reflection-type liquid crystal display device as set forth in claim 1 wherein said light reflecting surface is composed of surfaces of electrodes facing said transparent electrodes on said insulating substrate.

12. The reflection-type liquid crystal display device as set forth in claim 1, wherein a transmission axis of said polarizer and an alignment direction of said liquid crystal molecules on a light entering side are set so as to be substantially parallel.

13. The reflection-type liquid crystal display device as set forth in claim 1, wherein a transmission axis of said polarizer is tilted with respect to an alignment direction of said liquid crystal molecules on a light entering side, at an angle of 165° to 195° in an anti-clockwise direction.

14. The reflection-type liquid crystal display device as set forth in claim 1, wherein a transmission axis of said polarizer is tilted with respect to an alignment direction of said liquid crystal molecules in the middle in a thickness direction of said liquid crystal layer, at an angle of −15° to +15° in an anti-clockwise direction.

15. The reflection-type liquid crystal display device as set forth in claim 1, wherein a transmission axis of said polarizer is set in a substantially same direction as an alignment direction of the liquid crystal molecules positioning in the middle in a thickness direction of said liquid crystal layer.

16. A reflection-type liquid crystal display device as set forth in claim 1, further comprising:
   at least one optical phase compensating member, provided between said polarizer and said liquid crystal layer.

17. The reflection-type liquid crystal display device as set forth in claim 16, wherein said optical phase compensating member is a polymer oriented film or ultraviolet curable liquid-crystalline polymers.

18. A reflection-type liquid crystal display device as set forth in claim 1, further comprising:
   a light-absorption-type color filter layer, formed on said light reflecting surface of said light reflecting member, or on said insulating substrate.

19. A reflection-type liquid crystal display device as set forth in claim 1, wherein said light reflecting surface of said light reflecting member is an organic or inorganic reflection-type color filter layer,
   said reflection-type liquid crystal display device further comprising:
   an absorption layer, provided behind the reflection-type color filter layer.

20. The reflection-type liquid crystal display device as set forth in claim 1, wherein said light reflecting member is a semiconductor substrate, said light reflecting surface being formed on the semiconductor substrate.

21. A reflection-type liquid crystal device, comprising:
   an insulating substrate having transparent electrodes thereon;

a light reflecting member having a light reflecting surface on one side thereof;

a liquid crystal layer sealed between said insulating substrate and substrate and said light reflecting member; and at least one polarizer provided on a light entering side to said liquid crystal layer, wherein:

said liquid crystal layer includes liquid crystal molecules and liquid-crystalline polymers which are twist-aligned at a same angle, the twist alignment of said liquid crystal molecules and liquid-crystalline polymers being set so that incident light which is linearly polarized by said polarizer to have a first plane of polarization is converted to circularly polarized light and reaches said reflection surface, and then, the light reflected by said reflection surface is converted to linearly polarized light having a second plane of polarization when outgoing to said polarizer, the second plane of polarization being same as the first plane of polarization rotated through an angle of 90°, and a mixing ratio or a difference in refractive index of said liquid crystal molecules and liquid-crystalline polymers being set so that, by application of a voltage, the light is diffused when outgoing, with the first plane of polarization substantially maintained, while only said liquid crystal molecules respond to the applied voltage.

* * * * *